United States Patent
Park et al.

(10) Patent No.: US 10,749,583 B2
(45) Date of Patent: Aug. 18, 2020

(54) METHOD FOR TRANSMITTING AND RECEIVING CHANNEL STATE INFORMATION IN WIRELESS COMMUNICATION SYSTEM AND DEVICE FOR THE SAME

(71) Applicant: LG ELECTRONICS INC., Seoul (KR)

(72) Inventors: Haewook Park, Seoul (KR); Kijun Kim, Seoul (KR); Minki Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/319,225

(22) PCT Filed: Jun. 14, 2018

(86) PCT No.: PCT/KR2018/006713
§ 371 (c)(1),
(2) Date: Jan. 18, 2019

(87) PCT Pub. No.: WO2018/230966
PCT Pub. Date: Dec. 20, 2018

(65) Prior Publication Data
US 2020/0195319 A1 Jun. 18, 2020

Related U.S. Application Data

(60) Provisional application No. 62/566,456, filed on Oct. 1, 2017, provisional application No. 62/519,836, filed on Jun. 14, 2017.

(51) Int. Cl.
*H04B 7/0456* (2017.01)
*H04L 1/16* (2006.01)
(Continued)

(52) U.S. Cl.
CPC ......... *H04B 7/0473* (2013.01); *H04B 7/0417* (2013.01); *H04B 7/0456* (2013.01);
(Continued)

(58) Field of Classification Search
CPC . H04W 72/1226; H04W 72/06; H04W 40/06; H04L 25/03898; H04L 25/03949;
(Continued)

(56) References Cited

U.S. PATENT DOCUMENTS

2012/0082248 A1* 4/2012 Han .................. H04B 1/04
375/259
2015/0023280 A1 1/2015 Kim et al.
(Continued)

FOREIGN PATENT DOCUMENTS

JP 2012506194 3/2012
KR 10-2018-0043374 4/2018
(Continued)

OTHER PUBLICATIONS

Samsung, 'Draft CR on Higher-Layer Parameters for 36.213', R1-1706766, 3GPP TSG-RAN WG1 Meeting #88bis, Spokane, USA, Apr. 9, 2017, 95 pages.
(Continued)

*Primary Examiner* — Ashley Shivers
(74) *Attorney, Agent, or Firm* — Fish & Richardson P.C.

(57) ABSTRACT

It is disclosed a method for transmitting and receiving channel state information in a wireless communication system and a device for supporting the same. Particularly, a method for transmitting channel state information performed by a User Equipment (UE) may include receiving, from a base station, a bitmap for configuring codebook subset restriction (CSR) and reporting, to the base station, Channel State Information (CSI), when a number of antenna ports is configured as 16 or more and a number of layers
(Continued)

associated with a rank indicator (RI) in the CSI is 3 or 4, a unit of multiple bits in a bitmap for configuring the CSR is associated with each precoder, and a reporting of precoding matrix indicator (PMI) corresponding to the precoder associated with the multiple bits is restricted in the CSI, when the CSR is indicated in any one of the multiple bits, and each bit in the bitmap for configuring the CSR is associated with each precoder.

16 Claims, 20 Drawing Sheets

(51) Int. Cl.
*H04B 7/06* (2006.01)
*H04L 25/03* (2006.01)
*H04W 72/12* (2009.01)
*H04W 40/06* (2009.01)
*H04B 7/0417* (2017.01)

(52) U.S. Cl.
CPC ......... *H04B 7/0486* (2013.01); *H04B 7/0626* (2013.01); *H04B 7/0663* (2013.01); *H04L 1/1614* (2013.01); *H04L 25/03923* (2013.01); *H04W 40/06* (2013.01); *H04W 72/1226* (2013.01)

(58) Field of Classification Search
CPC ........... H04L 25/4975; H04L 25/03917; H04L 25/03923; H04L 1/0693; H04B 7/0456; H04B 7/0478; H04B 7/0639; H04B 7/0473
See application file for complete search history.

(56) References Cited

U.S. PATENT DOCUMENTS

| | | |
|---|---|---|
| 2016/0013853 A1 | 1/2016 | Han et al. |
| 2016/0323022 A1 | 11/2016 | Rahman et al. |
| 2016/0329937 A1* | 11/2016 | Shi ........................ H04B 7/0417 |
| 2016/0360451 A1* | 12/2016 | Shi ........................ H04W 36/08 |
| 2018/0331736 A1* | 11/2018 | Lidian .................. H04B 7/0486 |
| 2019/0068256 A1* | 2/2019 | Muruganathan ..... H04B 7/0639 |

FOREIGN PATENT DOCUMENTS

| | | |
|---|---|---|
| KR | 10-2018-0135874 | 7/2019 |
| WO | WO2016114708 | 7/2016 |
| WO | WO2016164073 | 10/2016 |
| WO | WO2017078611 | 5/2017 |

OTHER PUBLICATIONS

Samsung, 'Draft CR on CSR for CSI feedback for semi-OL transmission', R1-1707873, 3GPP TSG-RAN WG1 Meeting #89, Hangzhou, China, May 6, 2017, 12 pages.

Ericsson, "On Codebook Subset Restriction," R1-1716362, 3GPP TSG-RAN WG1 NR Ad HOC #3, Nagoya, Japan, dated Sep. 18-21, 2017, 9 pages.

Intel Corporation, "Discussion on codebook subset restriction for NR," R1-1712546, 3GPP TSG RAN WG1 #90, Prague, Czech Republic, dated Aug. 21-25, 2017, 4 pages.

Extended European Search Report in European Application No. 18818331.3, dated Dec. 20, 2019, 8 pages.

Qualcomm Incorporated, "Draft CR on simultaneous transmission of periodic and aperiodic CSI in eLAA," R1-1611575, 3GPP TSG RAN WG1 #87(Nov. 5, 2016).

Catt, "Remaining details of CSI feedback," R1-131878, 3GPP TSG RAN WG1 #73, 3GPP Date of server opening (May 11, 2013).

ZTE, "Multi-panel and Multi-level Codebook Design," 3GPP TSG RAN WG1 Meeting #89, R1-1708818, 3GPP Date of server opening (May 7, 2017).

Notice of Allowance in Korean Appln. No. 10-2019-0070921, dated Jun. 23, 2020.

* cited by examiner (a)

(b)

METHOD FOR TRANSMITTING AND RECEIVING CHANNEL STATE INFORMATION IN WIRELESS COMMUNICATION SYSTEM AND DEVICE FOR THE SAME

CROSS-REFERENCE TO RELATED APPLICATIONS

This application is the National Stage filing under 35 U.S.C. 371 of International Application No. PCT/KR2018/006713, filed on Jun. 14, 2018, which claims the benefit of U.S. Provisional Application No. 62/519,836, filed on Jun. 14, 2017, and No. 62/566,456, filed on Oct. 1, 2017, the contents of which are all hereby incorporated by reference herein in their entirety.

TECHNICAL FIELD

The present invention relates to wireless communications, and more particularly, to a method for transmitting and receiving channel state information in a wireless communication system that supports a multiple antenna system (particularly, 2 dimensional active antenna system (2D AAS)) and a device for supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a method for transmitting and receiving channel state information when a codebook is configured for codebook subset restriction and/or rank restriction, and the like.

An object of the present invention is to propose a method for configuring/applying codebook subset restriction for the purpose of inter-cell interference control when a codebook represented by types I and II, and the like is used, which are used in New Radio Access Technology (NR).

Technological objects to be achieved by the present invention are not limited to the aforementioned objects, and other objects that have not been described may be clearly understood by a person having ordinary skill in the art to which the present invention pertains from the following description.

Technical Solution

According to an aspect of the present invention, a method for transmitting channel state information in a wireless communication system performed by a User Equipment (UE) may include receiving, from a base station, a bitmap for configuring codebook subset restriction (CSR) and reporting, to the base station, Channel State Information (CSI), when a number of antenna ports is configured as 16 or more and a number of layers associated with a rank indicator (RI) in the CSI is 3 or 4, a unit of multiple bits in a bitmap for configuring the CSR is associated with each precoder, and a reporting of precoding matrix indicator (PMI) corresponding to the precoder associated with the multiple bits is restricted in the CSI, when the CSR is indicated in any one of the multiple bits, and each bit in the bitmap for configuring the CSR is associated with each precoder, and a reporting of PMI corresponding to the precoder associated with a bit in which the CSR is indicated is restricted in the CSI, except the case that the number of antenna ports is configured as 16 or more and the number of layers associated with the RI in the CSI is 3 or 4.

According to another aspect of the present invention, a method for receiving channel state information in a wireless communication system performed by a base station may include transmitting, to a User Equipment (UE), a bitmap for configuring codebook subset restriction (CSR) and receiving, from the UE, Channel State Information (CSI), when a number of antenna ports is configured as 16 or more and a number of layers associated with a rank indicator (RI) in the CSI is 3 or 4, wherein a unit of multiple bits in a bitmap for configuring the CSR is associated with each precoder, and a reporting of precoding matrix indicator (PMI) corresponding to the precoder associated with the multiple bits is restricted in the CSI, when the CSR is indicated in any one of the multiple bits, and wherein each bit in the bitmap for configuring the CSR is associated with each precoder, and a reporting of PMI corresponding to the precoder associated with a bit in which the CSR is indicated is restricted in the CSI, except the case that the number of antenna ports is configured as 16 or more and the number of layers associated with the RI in the CSI is 3 or 4.

Preferably, the bitmap for configuring the CSR may be commonly applied without regard to the number of layers associated with the rank indicator (RI) in the CSI.

Preferably, when the number of antenna ports is configured as 16 or more and the number of layers associated with the RI in the CSI is 3 or 4, the multiple bits includes three bits, and indexes of the three bits have a relation of multiple with a specific number.

Preferably, the bit in the bitmap for configuring the CSR may belong to a unit of one or multiple bits.

Preferably, when the CSR is indicated in any one bit in the bitmap for configuring the CSR, depending on the number of a unit of multiple bits to which the one bit belongs, a reporting of the PMI corresponding a single or multiple precoders may be restricted.

Preferably, from the base station, a bitmap for a rank restriction configuration may be transmitted to the UE.

Preferably, a bitwidth for reporting the rank indicator (RI) in the CSI may be determined depending on a number of rank indicators in which a reporting is allowed by the bitmap for the rank restriction configuration.

Preferably, a reporting of the rank indicator (RI) corresponding to the layer associated with a bit in which a rank restriction in the bitmap for the rank restriction configuration is indicated may be restricted in the CSI.

Preferably, the UE may be a UE in which a codebook type of a single panel to which a linear combination is not applied is configured.

Technical Effects

According to an embodiment of the present invention, a codebook configuration is applied, and accordingly, inter-cell interference may be decreased.

In addition, according to an embodiment of the present invention, a feedback bit size of Channel State Information (CSI) is determined based on a codebook configuration, and accordingly, CSI feedback overhead may be reduced.

Effects which may be obtained by the present invention are not limited to the aforementioned effects, and other effects that have not been described may be clearly understood by a person having ordinary skill in the art to which the present invention pertains from the following description.

DESCRIPTION OF DRAWINGS

The accompanying drawings, which are included herein as a part of the description for help understanding the present invention, provide embodiments of the present invention, and describe the technical features of the present invention with the description below.

BEST MODE FOR INVENTION

Figure 1:
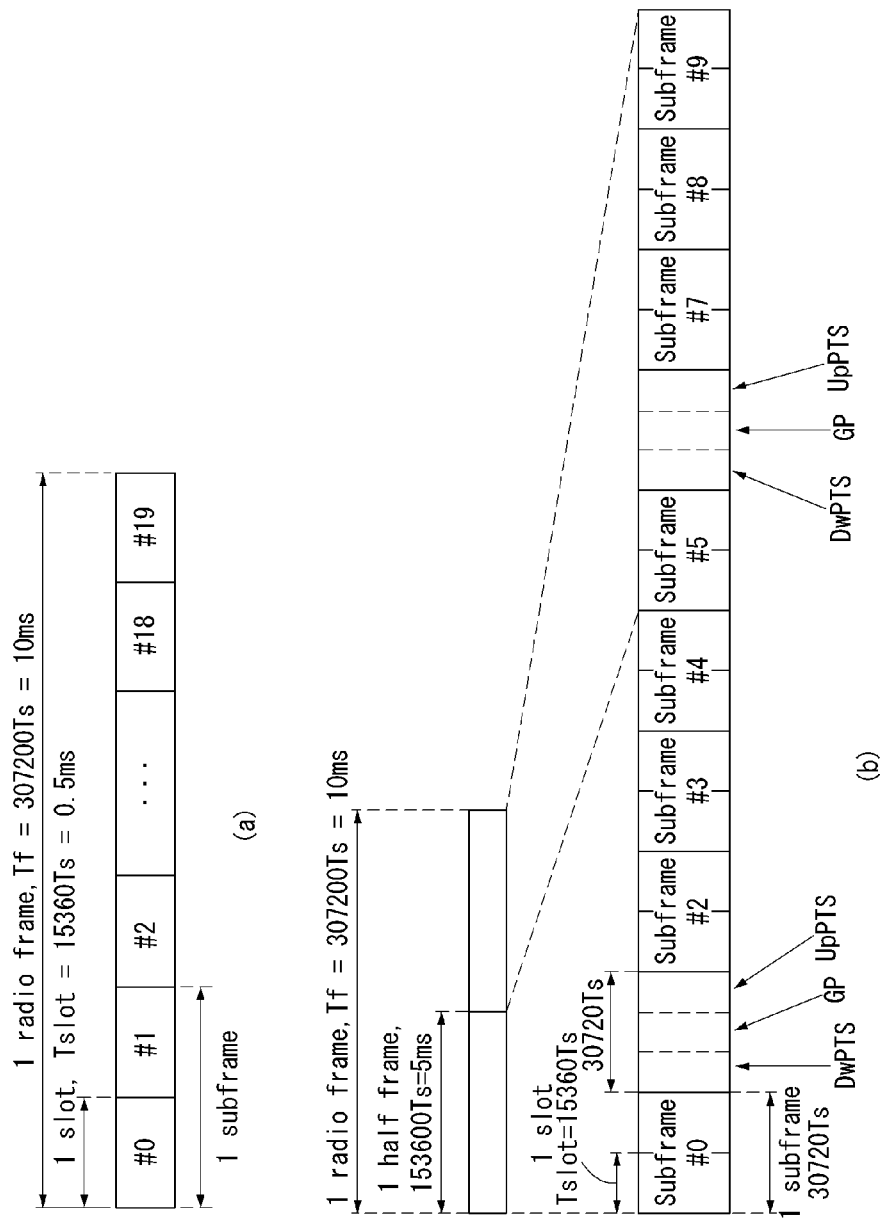
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), gNB, a Base Transceiver System (BTS), an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=$ lms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from DL to UL or a point of time at which a change is performed from UL to DL is called a switching point. The Switch-point periodicity means a cycle in which a UL subframe and a DL subframe are changed is identically repeated. Both 5 ms and 10 ms are supported in the periodicity of a switching point. In the case that the periodicity of a switching point has a cycle of a 5 ms DL-UL switching point, the special subframe S is present in each half frame. In the case that the periodicity of a switching point has a cycle of a 5 ms DL-UL switching point, the special subframe S is present in the first half frame only.

In all the configurations, 0 and 5 subframes and a DwPTS are used for only DL transmission. An UpPTS and a subframe subsequent to a subframe are always used for UL transmission.

Such DL-UL configurations may be known to both an eNB and UE as system information. An eNB may notify UE of a change of the UL-DL allocation state of a radio frame by transmitting only the index of UL-DL configuration information to the UE whenever the UL-DL configuration information is changed. Furthermore, configuration information is kind of DL control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
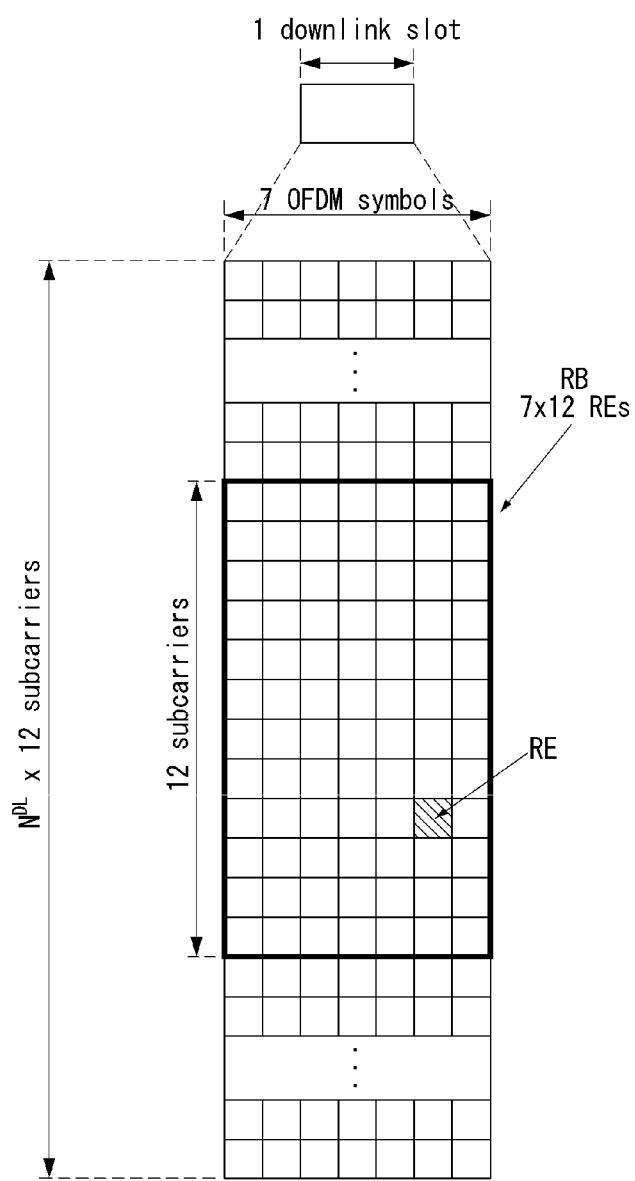
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

Figure 3:
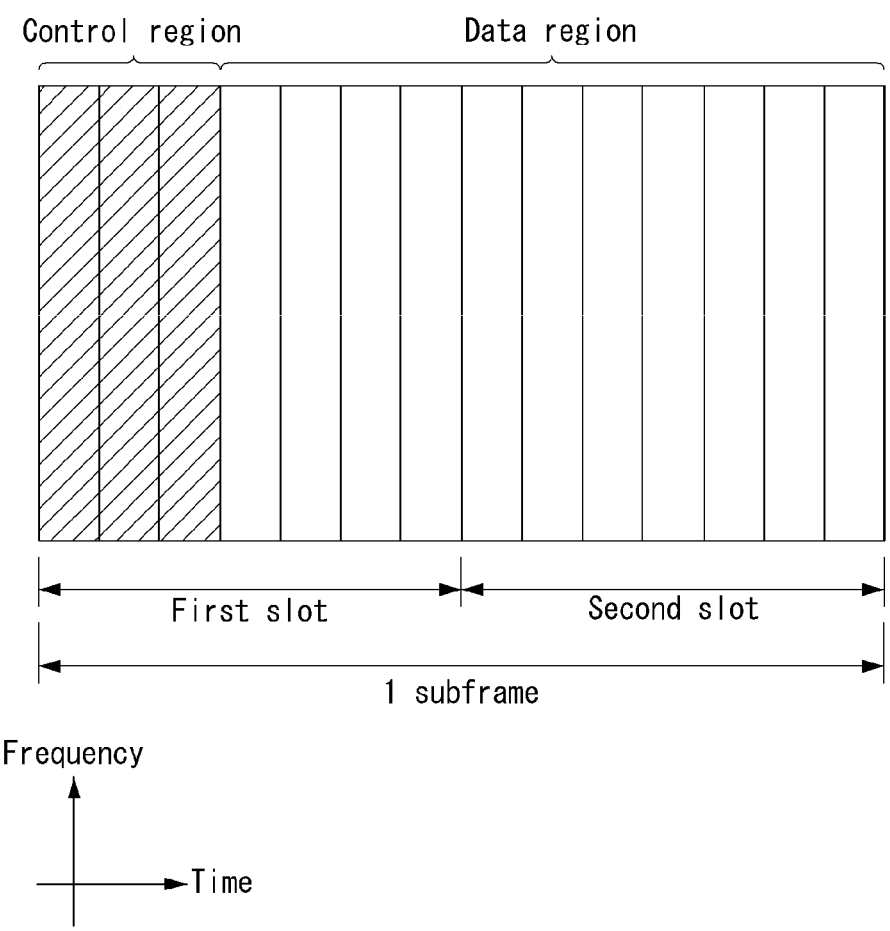
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
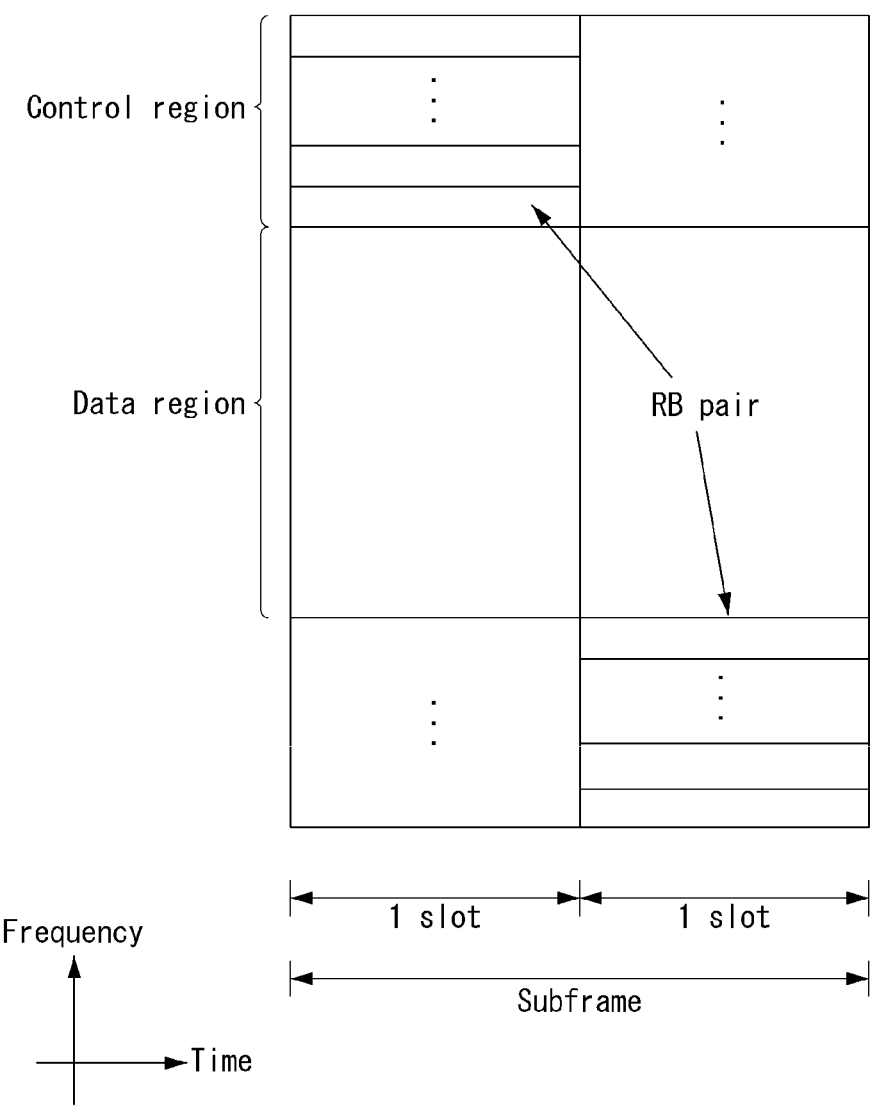
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
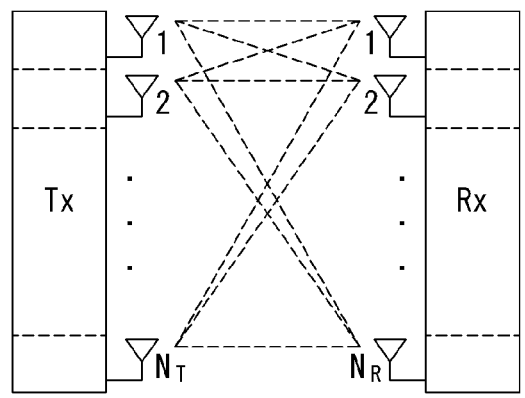
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R)$$ [Equation 1]

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T$$ [Equation 2]

Meanwhile, transmission power may be different in each of pieces of transmission information s_1, s_2, ..., s_{N_T}. In this case, if pieces of transmission power are P_1, P_2, ..., P_{N_T}, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$
[Equation 5]

$$W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T$$ [Equation 6]

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
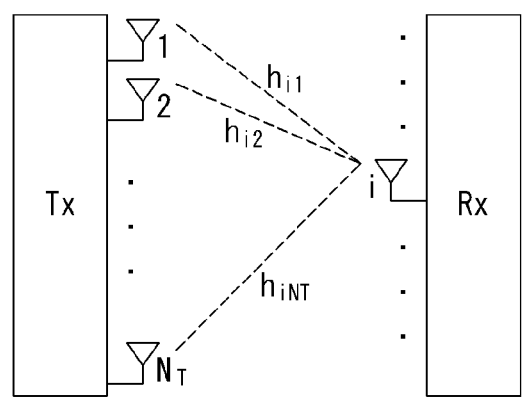
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}]$$ [Equation 7]

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$
[Equation 8]

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_{N_R}]^T$$ [Equation 9]

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$
[Equation 10]

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a 'rank' for MIMO transmission indicates the number of paths through which signals may be independently transmitted at a specific point of time and a specific frequency resource. The 'number of layers' indicates the number of signal streams transmitted through each path. In general, a rank has the same meaning as the number of layers unless otherwise described because a transmission end sends the number of layers corresponding to the number of ranks used in signal transmission.

Hereinafter, in relation to the MIMO transmission techniques described above, a codebook-based precoding technique will be described in detail.

Figure 7:
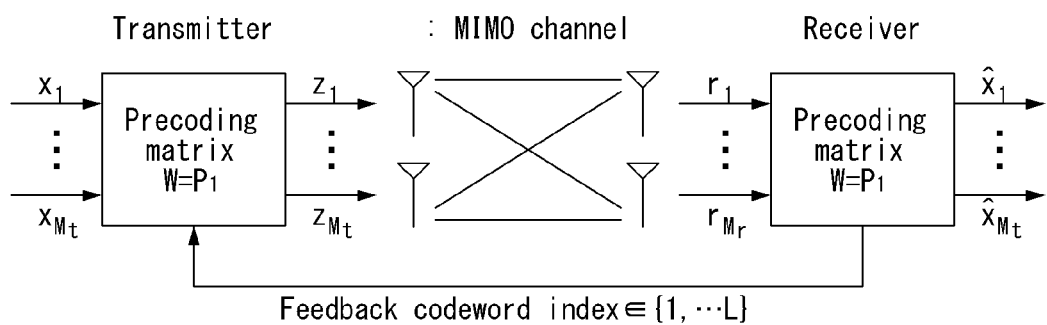
FIG. 7 is a diagram for describing a basic concept of a codebook-based precoding in a wireless communication system to which the present invention may be applied.

FIG. 7 is a diagram for describing a basic concept of a codebook-based precoding in a wireless communication system to which the present invention may be applied.

According to the codebook-based precoding technique, a transmitting-end and a receiving-end share codebook information that includes a predetermined number of precoding matrixes according to a transmission rank, the number of antennas, and so on.

That is, in the case that feedback information is finite, the precoding-based codebook technique may be used.

A receiving-end may measure a channel state through a receiving signal, and may feedback a finite number of preferred matrix information (i.e., index of the corresponding precoding matrix) based on the codebook information described above. For example, a receiving-end may measure a signal in Maximum Likelihood (ML) or Minimum Mean Square Error (MMSE) technique, and may select an optimal precoding matrix.

FIG. 7 shows a case that a receiving-end transmits the precoding matrix information for each codeword to a transmitting-end, but the present invention is not limited thereto.

The transmitting-end that receives the feedback information from the receiving-end may select a specific precoding matrix from the codebook based on the received information. The transmitting-end that selects the precoding matrix may perform precoding in a manner of multiplying layer signals, of which number amounts to a transmission rank, by the selected precoding matrix and may transmit the precoded transmission signal via a plurality of antennas. The number of rows in a precoding matrix is equal to the number of antennas, while the number of columns is equal to a rank value. Since the rank value is equal to the number of layers, the number of the columns is equal to the number of the layers. For instance, when the number of transmitting antennas and the number of layers are 4 and 2, respectively, a precoding matrix may include 4×2 matrix. Equation 12 below represents an operation of mapping information mapped to each layer to a respective antenna through the precoding matrix in the case.

$$\begin{bmatrix} y_1 \\ y_2 \\ y_3 \\ y_4 \end{bmatrix} = \begin{bmatrix} P_{11} & y_1 \\ P_{12} & y_1 \\ P_{13} & y_1 \\ P_{14} & y_1 \end{bmatrix} \cdot \begin{bmatrix} x_1 \\ x_2 \end{bmatrix}$$ [Equation 12]

Referring to Equation 12, information mapped to a layer includes x_1 and x_2 and each element p_ij of 4×2 matrix is a weight used for precoding. y_1, y_2, y_3 and y_4 indicate information mapped to antennas and may be transmitted via corresponding antennas by OFDM transmission schemes, respectively.

The receiving-end that receives the signal precoded and transmitted in the transmitting-end may reconstruct the received signal by performing inverse processing of the precoding performed in the transmitting-end. Generally, since a precoding matrix satisfies such a unitary matrix (U) condition as U·U^H=I (herein, U^H means an Hermit matrix of matrix U), the above-mentioned inverse processing of the precoding may be performed in a manner of multiplying the received signal by Hermit matrix P^H of the precoding matrix P used for the precoding performed by the transmitting-end.

In addition, since the precoding is requested to have good performance for antenna configurations of various types, it may be necessary to consider performance for various antenna configurations in codebook design. In the following description, an exemplary configuration of multiple antennas is explained.

In the conventional 3GPP LTE system (e.g., system according to 3GPP LTE Release-8 or Release-9 Standard), since maximum four transmission antennas are supported in DL, a codebook for four transmission antennas is designed. In the 3GPP LTE-A system evolved from the conventional 3GPP LTE system, maximum eight transmission antennas may be supported in DL. Accordingly, it may be necessary to design a precoding codebook that provides good performance for a DL transmission via maximum eight transmission antennas.

Moreover, when a codebook is designed, generally required are constant modulus property, finite alphabet, restriction on a codebook size, nested property, and providing good performance for various antenna configurations.

The constant modulus property means a property that amplitude of each channel component of a precoding matrix configuring a codebook is constant. According to this property, no matter what kind of a precoding matrix is used, power levels transmitted from all antennas may be maintained equal to each other. Hence, it may be able to raise efficiency in using a power amplifier.

The finite alphabet means to configure precoding matrixes using quadrature phase shift keying (QPSK) alphabet (i.e., ±1, ±j) only except a scaling factor in the case of two transmitting antennas, for example. Accordingly, when multiplication is performed on a precoding matrix by a precoder, it may alleviate the complexity of calculation.

The codebook size may be restricted as a predetermined size or smaller. Since a size of a codebook increases, precoding matrixes for various cases may be included in the codebook, and accordingly, a channel status may be more accurately reflected. However, the number of bits of a precoding matrix indicator (PMI) correspondingly increases to cause signaling overhead.

The nested property means that a portion of a high rank precoding matrix is configured with a low rank precoding matrix. Thus, when the corresponding precoding matrix is configured, an appropriate performance may be guaranteed even in the case that a BS determines to perform a DL transmission of a transmission rank lower than a channel rank indicated by a rank indicator (RI) reported from a UE. In addition, according to this property, complexity of channel quality information (CQI) calculation may be reduced. This is because calculation for a precoding matrix selection may be shared in part when an operation of selecting a precoding matrix from precoding matrixes designed for different ranks is performed.

Providing good performance for various antenna configurations may mean that providing performance over a predetermined level is required for various cases including a low correlated antenna configuration, a high correlated antenna configuration, a cross-polarized antenna configuration and the like.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 8:
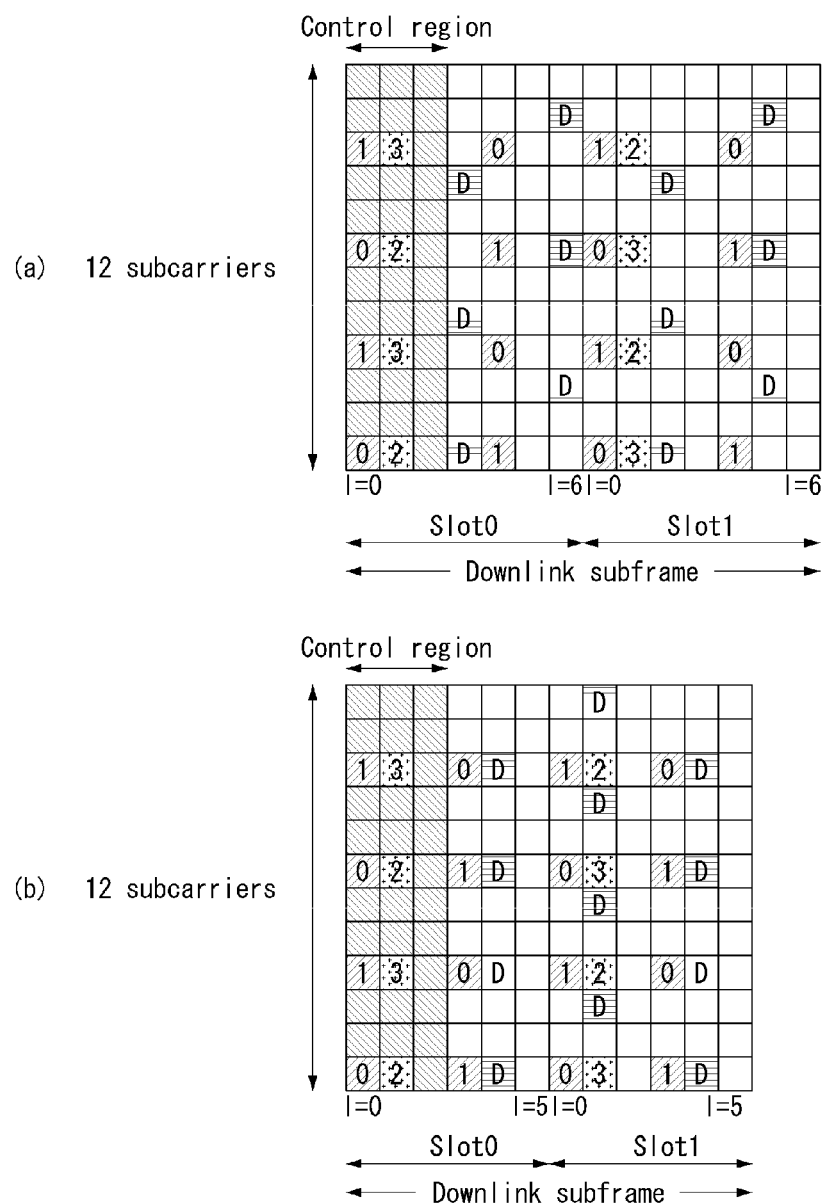
FIG. 8 illustrates reference signal patterns mapped to downlink resource block pairs in a wireless communication system to which the present invention may be applied.

FIG. 8 illustrates reference signal patterns mapped to downlink resource block pairs in a wireless communication system to which the present invention may be applied.

Referring to FIG. 8, a downlink resource block pair, that is, a unit in which a reference signal is mapped may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7*a*) and has a length of 12 OFDM symbols in the case of an extended cyclic prefix (CP) (FIG. 7*b*). In the resource block lattice, resource elements (REs) indicated by '0', '1', '2', and '3' mean the locations of the CRSs of antenna port indices '0', '1', '2', and '3', respectively, and REs indicated by 'D' mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 8.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user-multi-input/output (MIMO) antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, in the case that an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the purpose of the channel measurement is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, in the case that RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, ..., 18, and p=15, ..., 22, respectively. A CSI-RS may be defined for only a subcarrier interval $\Delta f=15$ kHz.

In a subframe configured for CSI-RS transmission, a CSI-RS sequence is mapped to a complex-valued modulation symbol a_k,l^(p) used as a reference symbol on each antenna port p as in Equation 13.

$$a_{k,l}^{(p)} = w_{l''} \cdot r_{l,n_s}(m') \qquad \text{[Equation 13]}$$

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +$$

-continued $$l'' = \begin{cases} \text{CSI reference signal configurations 0-19,} \\ \quad \text{normal cyclic prefix} \\ 2l'' \quad \text{CSI reference signal configurations 20-31,} \\ \quad \text{normal cyclic prefix} \\ l'' \quad \text{CSI reference signal configurations 0-27,} \\ \quad \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 13, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| CSI reference signal configuration | | Number of CSI reference signals configured | | | | |
|---|---|---|---|---|---|---|
| | | 1 or 2 | | 4 | | 8 |
| | | (k',l') | $n_s$ mod 2 | (k',l') | $n_s$ mod 2 | (k',l') | $n_s$ mod 2 |
| Frame structure type 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| Frame structure type 2 only | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

Table 4 illustrates the mapping of (k',l') from a CSI-RS configuration in an extended CP.

TABLE 4

| CSI reference signal configuration | | Number of CSI reference signals configured | | | | |
|---|---|---|---|---|---|---|
| | | 1 or 2 | | 4 | | 8 |
| | | (k',l') | $n_s$ mod 2 | (k',l') | $n_s$ mod 2 | (k',l') | $n_s$ mod 2 |
| Frame structure type 1 and 2 | 0 | (11,4) | 0 | (11,4) | 0 | (11,4) | 0 |
| | 1 | (9,4) | 0 | (9,4) | 0 | (9,4) | 0 |
| | 2 | (10,4) | 1 | (10,4) | 1 | (10,4) | 1 |
| | 3 | (9,4) | 1 | (9,4) | 1 | (9,4) | 1 |
| | 4 | (5,4) | 0 | (5,4) | 0 | | |
| | 5 | (3,4) | 0 | (3,4) | 0 | | |
| | 6 | (4,4) | 1 | (4,4) | 1 | | |
| | 7 | (3,4) | 1 | (3,4) | 1 | | |
| | 8 | (8,4) | 0 | | | | |
| | 9 | (6,4) | 0 | | | | |
| | 10 | (2,4) | 0 | | | | |
| | 11 | (0,4) | 0 | | | | |
| | 12 | (7,4) | 1 | | | | |
| | 13 | (6,4) | 1 | | | | |
| | 14 | (1,4) | 1 | | | | |
| | 15 | (0,4) | 1 | | | | |
| Frame structure type 2 | 16 | (11,1) | 1 | (11,1) | 1 | (11,1) | 1 |
| | 17 | (10,1) | 1 | (10,1) | 1 | (10,1) | 1 |
| | 18 | (9,1) | 1 | (9,1) | 1 | (9,1) | 1 |
| | 19 | (5,1) | 1 | (5,1) | 1 | | |
| | 20 | (4,1) | 1 | (4,1) | 1 | | |
| | 21 | (3,1) | 1 | (3,1) | 1 | | |
| | 22 | (8,1) | 1 | | | | |
| | 23 | (7,1) | 1 | | | | |
| | 24 | (6,1) | 1 | | | | |
| | 25 | (2,1) | 1 | | | | |
| | 26 | (1,1) | 1 | | | | |
| | 27 | (0,1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

Figure 9:
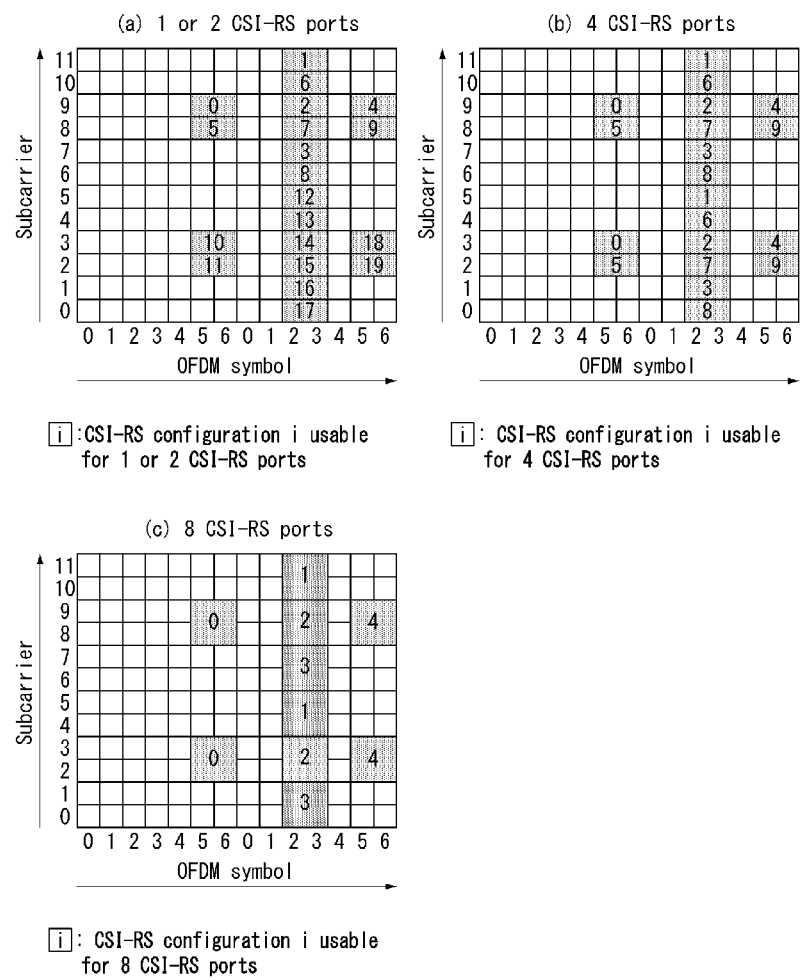
FIG. 9 is a diagram illustrating resources to which reference signals are mapped in a wireless communication system to which the present invention may be applied.

FIG. 9 is a diagram illustrating resources to which reference signals are mapped in a wireless communication system to which the present invention may be applied.

FIG. 9(a) shows twenty types of CSI-RS configurations available for CSI-RS transmission by one or two CSI-RS antenna ports, FIG. 9(b) shows ten types of CSI-RS configurations available for four CSI-RS antenna ports, and FIG. 9(c) shows five types of CSI-RS configurations available for eight CSI-RS antenna ports.

As described above, radio resources (i.e., an RE pair) in which a CSI-RS is transmitted are determined depending on each CSI-RS configuration.

In the case that one or two antenna ports are configured for CSI-RS transmission with respect to a specific cell, the CSI-RS is transmitted on radio resources on a configured CSI-RS configuration of the twenty types of CSI-RS configurations shown in FIG. 9(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 9(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 9(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 9(a) to 9(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zeropower (ZP) CSI-RS ('ZeroPowerCSI-RS) that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $Δ_{CSI-RS}$ (subframes) |
| --- | --- | --- |
| 0 – 4 | 5 | $I_{CSI-RS}$ |
| 5 – 14 | 10 | $I_{CSI-RS} - 5$ |
| 15 – 34 | 20 | $I_{CSI-RS} - 15$ |
| 35 – 74 | 40 | $I_{CSI-RS} - 35$ |
| 75 – 154 | 80 | $I_{CSI-RS} - 75$ |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 14.

$$(10n_f + \lfloor n_s/2 \rfloor - Δ_{CSI-RS}) \bmod T_{CSI-RS} = 0 \quad \text{[Equation 14]}$$

In Equation 14, T_CSI-RS means a CSI-RS transmission period, Δ_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration (s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

In the case that transmission mode 10 is configured, a
 CSI-RS resource configuration identifier
A CSI-RS port number (antennaPortsCount): a parameter
 (e.g., one CSI-RS port, two CSI-RS ports, four CSI-RS
 ports or eight CSI-RS ports) indicative of the number of
 antenna ports used for CSI-RS transmission
A CSI-RS configuration (resourceConfig) (refer to Table
 3 and Table 4): a parameter regarding a CSI-RS allocation resource location
A CSI-RS subframe configuration (subframeConfig, that
 is, I_CSI-RS) (refer to Table 5): a parameter regarding the period and/or offset of a subframe in which a CSI-RS will be transmitted In the case that transmission mode 9 is configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

In the case that transmission mode 10 is configured, transmission power P_C for CSI feedback with respect to each CSI process. When CSI subframe sets C_CSI,0 and C_CSI,1 are configured by a high layer with respect to a CSI process, P_C is configured for each CSI subframe set in the CSI process.

A pseudo-random sequence generator parameter n_ID

In the case that transmission mode 10 is configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is $\rho\_A$.

A CSI-RS and a PMCH are not configured in the same subframe of a serving cell at the same time.

In the frame structure type 2, in the case that four CRS antenna ports are configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE in which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE in which the transmission modes 1-9 are configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE in which the transmission mode 10 has been configured, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and attracts attention as a means for improving spectral efficiency, energy efficiency and processing complexity.

Recently, the massive MIMO system has been discussed in order to meet requirements for spectral efficiency of future mobile communication systems in 3GPP. Massive MIMO is also called full-dimension MIMO (FD-MIMO).

LTE release-12 and following wireless communication systems consider introduction of an active antenna system (AAS).

Distinguished from conventional passive antenna systems in which an amplifier capable of adjusting the phase and magnitude of a signal is separated from an antenna, the AAS is configured in such a manner that each antenna includes an active element such as an amplifier.

The AAS does not require additional cables, connectors and hardware for connecting amplifiers and antennas and thus has high energy efficiency and low operation costs. Particularly, the AAS supports electronic beam control per antenna and thus can realize enhanced MIMO for forming accurate beam patterns in consideration of a beam direction and a beam width or 3D beam patterns.

With the introduction of enhanced antenna systems such as the AAS, massive MIMO having a plurality of input/output antennas and a multi-dimensional antenna structure is also considered. For example, when a 2D antenna array instead of a conventional linear antenna array is formed, a 3D beam pattern can be formed using active antennas of the AAS.

Figure 10:
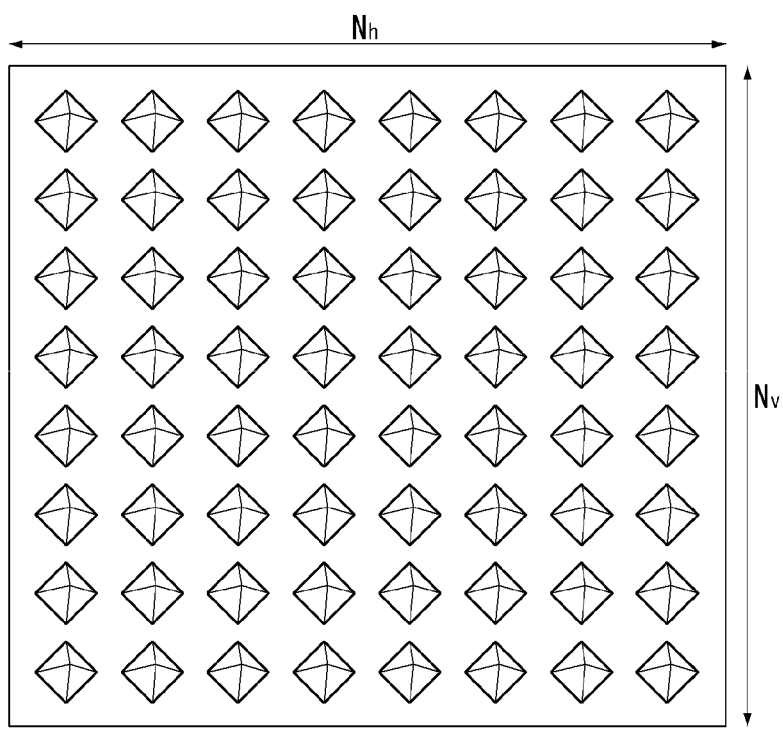
FIG. 10 illustrates a 2D-AAS having 64 antenna elements in a wireless communication system to which the present invention may be applied.

FIG. 10 illustrates a 2D AAS having 64 antenna elements in a wireless communication system to which the present invention is applicable.

FIG. 10 illustrates a normal 2D antenna array. A case in which Nt=Nv·Nh antennas are arranged in a square form, as shown in FIG. 10, may be considered. Here, Nh indicates the number of antenna columns in the horizontal direction and Nv indicates the number of antenna rows in the vertical direction.

When the aforementioned 2D antenna array is used, radio waves can be controlled in both the vertical direction (elevation) and the horizontal direction (azimuth) to control transmitted beams in a 3D space. A wavelength control mechanism of this type may be referred to as 3D beamforming.

Figure 11:
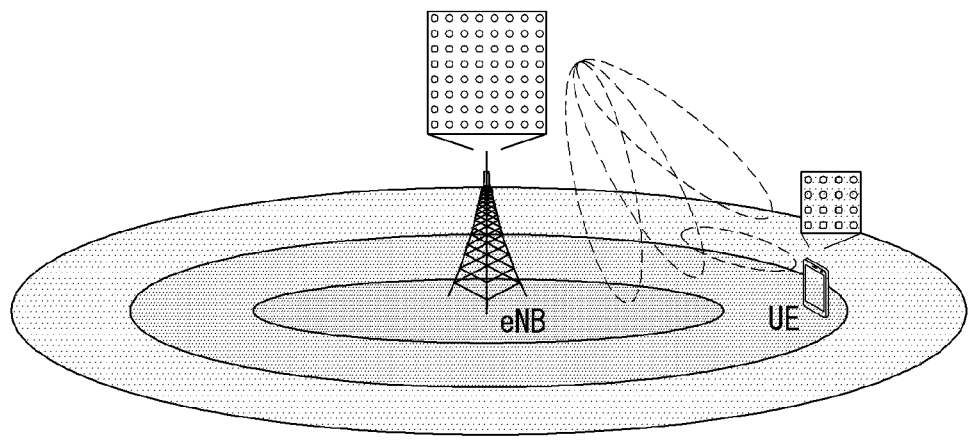
FIG. 11 illustrates a system in which an eNB or UE has a plurality of transmission/reception antennas capable of forming a 3D beam based on the AAS in a wireless communication system to which the present invention may be applied.

FIG. 11 illustrates a system in which an eNB or a UE has a plurality of transmission/reception antennas capable of forming AAS based 3D beams in a wireless communication system to which the present invention is applicable.

FIG. 11 schematizes the above-described example and illustrates a 3D MIMO system using a 2D antenna array (i.e., 2D-AAS).

From the viewpoint of transmission antennas, quasi-static or dynamic beam formation in the vertical direction as well as the horizontal direction of beams can be performed when a 3D beam pattern is used. For example, application such as sector formation in the vertical direction may be considered.

From the viewpoint of reception antennas, a signal power increase effect according to an antenna array gain can be expected when a received beam is formed using a massive reception antenna. Accordingly, in the case of uplink, an eNB can receive signals transmitted from a UE through a plurality of antennas, and the UE can set transmission power thereof to a very low level in consideration of the gain of the massive reception antenna.

Figure 12:
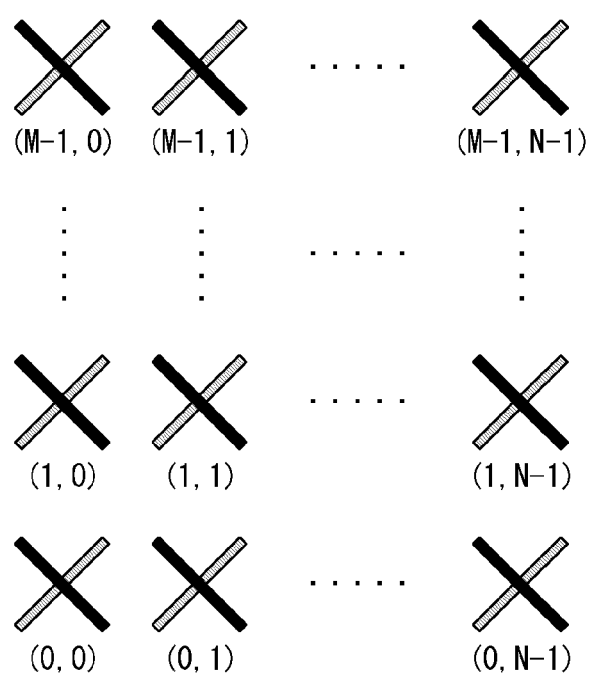
FIG. 12 illustrates a 2D antenna system having cross polarizations in a wireless communication system to which the present invention may be applied.

FIG. 12 illustrates a 2D antenna system having cross polarization in a wireless communication system to which the present invention is applicable.

2D planar antenna array model considering polarization may be schematized as shown in FIG. 12.

Distinguished from conventional MIMO systems using passive antennas, systems based on active antennas can dynamically control gains of antenna elements by applying a weight to an active element (e.g., amplifier) attached to (or included in) each antenna element. Since a radiation pattern depends on antenna arrangement such as the number of antenna elements and antenna spacing, an antenna system can be modeled at an antenna element level.

The antenna arrangement model as shown in FIG. 12 may be represented by (M, N, P) which corresponds to parameters characterizing an antenna arrangement structure.

M indicates the number of antenna elements having the same polarization in each column (i.e., in the vertical direction) (i.e., the number of antenna elements having +45° slant in each column or the number of antenna elements having −45° slant in each column).

N indicates the number of columns in the horizontal direction (i.e., the number of antenna elements in the horizontal direction).

P indicates the number of dimensions of polarization. P=2 in the case of cross polarization as shown in FIG. 12, whereas P=1 in the case of co-polarization.

An antenna port may be mapped to a physical antenna element. The antenna port may be defined by a reference signal associated therewith. For example, antenna port 0 may be associated with a cell-specific reference signal (CRS) and antenna port 6 may be associated with a positioning reference signal (PRS) in the LTE system.

For example, antenna ports and physical antenna elements may be one-to-one mapped. This may correspond to a case in which a single cross-polarization antenna element is used for downlink MIMO or downlink transmit diversity. For example, antenna port 0 may be mapped to a single physical antenna element, whereas antenna port 1 may be mapped to another physical antenna element. In this case, two downlink transmissions are present in terms of a UE. One is associated with a reference signal for antenna port 0 and the other is associated with a reference signal for antenna port 1.

Alternatively, a single antenna port may be mapped to multiple physical antenna elements. This may correspond to a case in which a single antenna port is used for beamforming. Beamforming can cause downlink transmission to be directed to a specific UE by using multiple physical antenna elements. This can be accomplished using an antenna array composed of multiple columns of multiple cross-polarization antenna elements in general. In this case, a single downlink transmission derived from a single antenna port is present in terms of a UE. One is associated with a CRS for antenna port 0 and the other is associated with a CRS for antenna port 1.

That is, an antenna port represents downlink transmission in terms of a UE rather than substantial downlink transmission from a physical antenna element in an eNB.

Alternatively, a plurality of antenna ports may be used for downlink transmission and each antenna port may be multiple physical antenna ports. This may correspond to a case in which antenna arrangement is used for downlink MIMO or downlink diversity. For example, antenna port 0 may be mapped to multiple physical antenna ports and antenna port 1 may be mapped to multiple physical antenna ports. In this case, two downlink transmissions are present in terms of a UE. One is associated with a reference signal for antenna port 0 and the other is associated with a reference signal for antenna port 1.

In FD-MIMO, MIMO precoding of a data stream may be subjected to antenna port virtualization, transceiver unit (TXRU) virtualization and an antenna element pattern.

In antenna port virtualization, a stream on an antenna port is precoded on TXRU. In TXRU virtualization, a TXRU signal is precoded on an antenna element. In the antenna element pattern, a signal radiated from an antenna element may have a directional gain pattern.

In conventional transceiver modeling, static one-to-on mapping between an antenna port and TXRU is assumed and TXRU virtualization effect is integrated into a (TXRU) antenna pattern including both the effects of the TXRU virtualization and antenna element pattern.

Antenna port virtualization may be performed through a frequency-selective method. In LTE, an antenna port is defined along with a reference signal (or pilot). For example, for transmission of data precoded on an antenna port, a DMRS is transmitted in the same bandwidth as that for a data signal and both the DMRS and the data signal are precoded through the same precoder (or the same TXRU virtualization precoding). For CSI measurement, a CSI-RS is transmitted through multiple antenna ports. In CSI-RS transmission, a precoder which characterizes mapping between a CSI-RS port and TXRU may be designed as an eigen matrix such that a UE can estimate a TXRU virtualization precoding matrix for a data precoding vector.

1D TXRU virtualization and 2D TXRU virtualization are discussed as TXRU virtualization methods, which will be described below with reference to the drawings.

Figure 13:
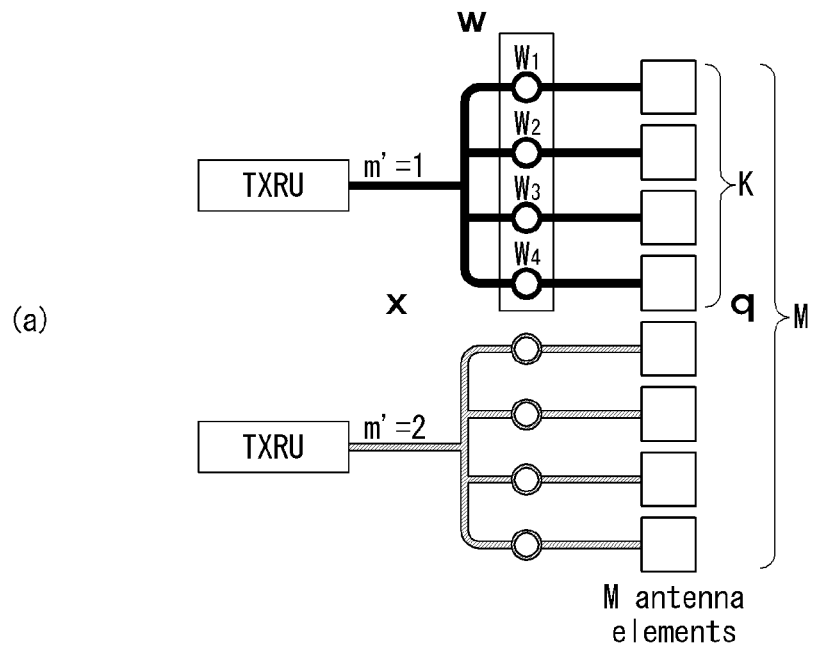
FIG. 13 illustrates a transceiver unit model in a wireless communication system to which the present invention may be applied.
Figure 13:
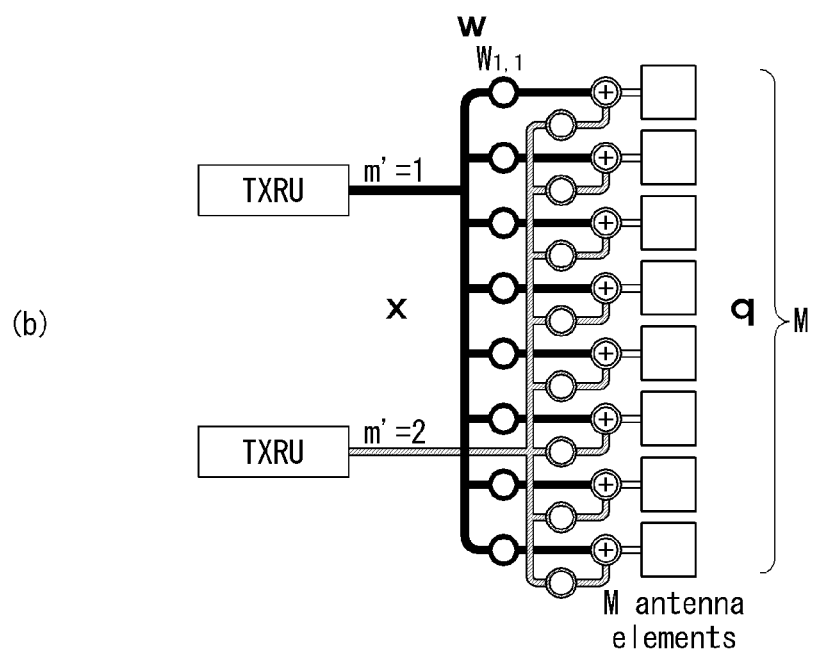

FIG. 13 illustrates transceiver unit models in a wireless communication system to which the present invention is applicable.

In 1D TXRU virtualization, M_TXRU TXRUs are associated with M antenna elements in a single-column antenna arrangement having the same polarization.

In 2D TXRU virtualization, a TXRU model corresponding to the antenna arrangement model (M, N, P) of FIG. 12 may be represented by (M_TXRU, N, P). Here, M_TXRU denotes the number of 2D TXRUs present in the same column and the same polarization, and M_TXRU≤M all the time. That is, a total number of TXRUs is M_TXRU×N×P.

TXRU virtualization models may be divided into TXRU virtualization model option-1: sub-array partition model as shown in FIG. 13(a) and TXRU virtualization model option-2: full-connection model as shown in FIG. 13(b) according to correlation between antenna elements and TXRU.

Referring to FIG. 13(a), antenna elements are partitioned into multiple antenna element groups and each TXRU is connected to one of the groups in the case of the sub-array partition model.

Referring to FIG. 13 (b), multiple TXRU signals are combined and delivered to a single antenna element (or antenna element array) in the case of the full-connection model.

In FIG. 13, q is a transmission signal vector of M co-polarized antenna elements in a single column, w is a wideband TXRU virtualization weight vector, W is a wideband TXRU virtualization weight matrix, and x is a signal vector of M_TXRU TXRUs.

Here, mapping between antenna ports and TXRUs may be 1-to-1 or 1-to-many mapping.

FIG. 13 shows an example of TXRU-to-antenna element mapping and the present invention is not limited thereto. The present invention may be equally applied to mapping between TXRUs and antenna elements realized in various manners in terms of hardware.

OFDM Numerology

As more communication devices require greater communication capacity, a necessity of mobile broadband communication which is more improved than the existing radio access technology (RAT) has been raised. In addition, the massive MTC (Machine Type Communications) that provides various services anytime and anywhere by connecting a plurality of devices and objects is also one of important issues, which is considered in a next generation communication. Moreover, it has been discussed a design of a communication system in which a service and/or a UE sensitive to reliability and latency. As such, an introduction of a next generation RAT has been discussed currently, which considers enhanced mobile broadband communication, massive MTC, Ultra-Reliable and Low Latency Communication (URLLC), and the like, and such a technology is commonly referred to as "new RAT (NR)".

Hereinafter, the Radio Access Network to which NR is applied in the present disclosure may be commonly called as New Generation-RAN (NG-RAN) or gNB, and this may be commonly called as a base station.

Self-Contained Subframe Structure

Figure 14:
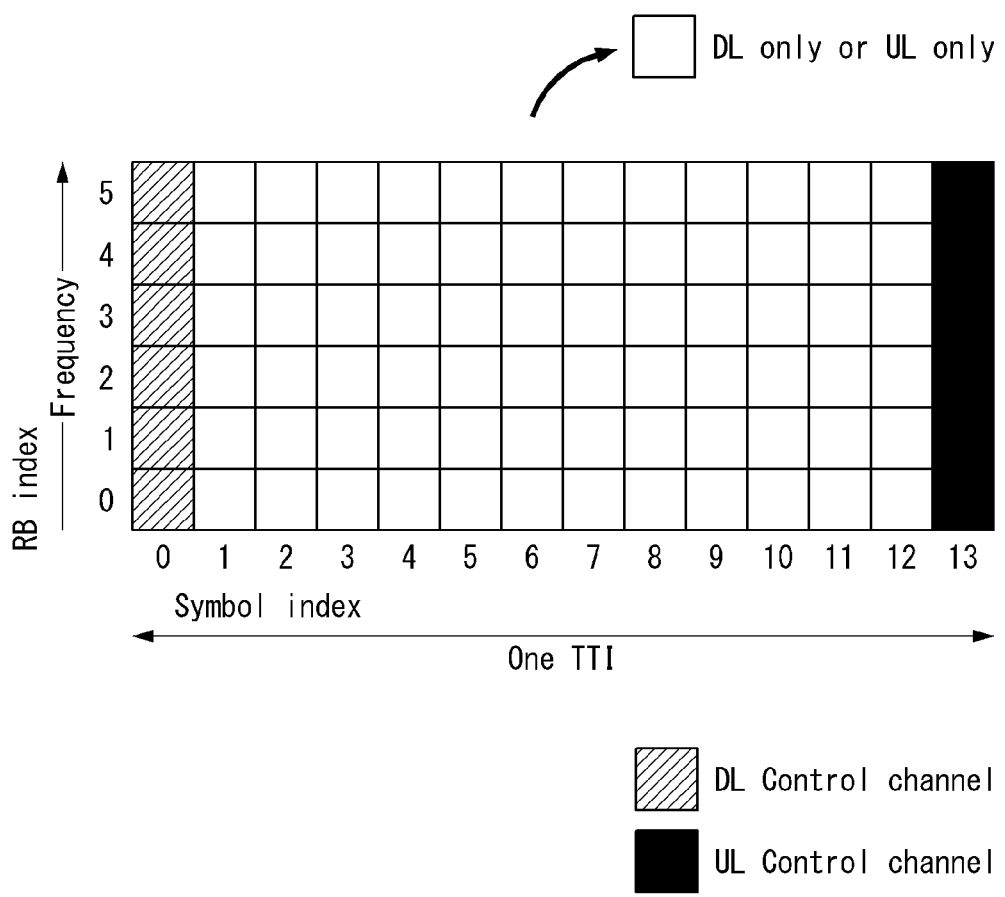
FIG. 14 illustrates a self-contained subframe structure to which the present invention may be applied.

In TDD system, in order to minimize data transmission latency, a self-contained subframe structure to which a control channel and a data channel are Time Division Multiplexed (TDMed) as shown in FIG. 14 has been considered in 5 Generation new RAT.

FIG. 14 illustrates a self-contained subframe structure to which the present invention may be applied.

The shaded area in FIG. 14 shows a transport region of a physical channel (e.g., PDCCH) for forwarding DCI, and the dark area shows a transport region of a physical channel (e.g., PUCCH) for forwarding Uplink Control Information (UCI).

The control information that an eNB forwards to a UE through DCI includes information of a cell configuration that the UE needs to know, DL-specific information such as DL scheduling, and the like, and/or UL-specific information such as UL grant. Further, the control information that an eNB forwards to a UE through UCI includes ACK/NACK report of HARQ for a DL data, CSI report for DL channel state, and/or Scheduling Request (SR), and so on.

The area not marked in FIG. 14 may be used for transport region of a physical channel (e.g., PDSCH) for a downlink (DL) data and a transport region of a physical channel (e.g., PUSCH) for an uplink (UL) data. In the characteristics of such a structure, a DL transmission and a UL transmission may be sequentially progressed in a subframe (SF), a DL data may be transmitted, and a UL ACK/NACK may be received in the corresponding SF. Consequently, according to this structure, a time required for retransmitting data is reduced when a data transmission error occurs, and owing to this, the delay till the final data forwarding may be minimized.

In such a self-contained subframe structure, a time gap is required for a process that an eNB and a UE switch from a transmission mode to a reception mode or a process that an eNB and a UE switch from a reception mode to a transmission mode. For this, a part of OFDM symbols on the timing switching from DL to UL may be setup as GP, and such a subframe type may be referred to as 'self-contained SF'.

Analog Beamforming

In Millimeter Wave (mmW) band, a wavelength becomes short and an installation of a plurality of antenna elements is available in the same area. That is, the wavelength in 30 GHz band is 1 cm, and accordingly, an installation of total 64 (8×8) antenna elements is available in 2-dimensional arrangement shape with 0.5 lambda (wavelength) intervals in 5 by 5 cm panel. Therefore, in mmW band, beamforming (BF) gain is increased by using a plurality of antenna elements, and accordingly, coverage is increased or throughput becomes higher.

In this case, each antenna element has a Transceiver Unit (TXRU) such that it is available to adjust a transmission power and a phase, and independent beamforming is available for each frequency resource. However, it has a problem that effectiveness is degraded in a cost aspect when TXRUs are installed in all of about 100 antenna elements. Accordingly, a method has been considered to map a plurality of antenna elements in a single TXRU and to adjust a direction of beam by an analog phase shifter. Such an analog beamforming technique may make only one beam direction throughout the entire band, and there is a disadvantage that frequency selective beamforming is not available.

As a middle form between a Digital BF and an analog BF, B number of hybrid BF may be considered which is smaller than Q number of antenna element. In this case, directions of beams that may be transmitted simultaneously are limited lower than B number; even it is changed according to a connection scheme between B number of TXRUs and Q number of antenna elements.

In addition, in the case that multiple antennas are used in the New RAT system, a hybrid beamforming technique has emerged, in which digital beamforming and analogue beamforming are combined. In this case, the analog beamforming (or radio frequency (RF) beamforming) means an operation of performing precoding (or combining) in an RF terminal. In the hybrid beamforming technique, each of a Baseband terminal and an RF terminal performs precoding (or combining), and owing to this, there is an advantage that a performance approaching to the digital beamforming can be attained while the number of RF chains and the number of digital (D)/analog (A) (or A/D) converters are reduced. For the convenience of description, a hybrid beamforming structure may be represented by N transceiver units (TXRUs) and M physical antennas. Then, the digital beamforming for L data layers that are going to be transmitted in a transmitter may be represented by N by L matrix. Then, the analog beamforming is applied that the transformed N digital signals are transformed to analog signals through a TXRU, and then represented by M by N matrix.

Figure 15:
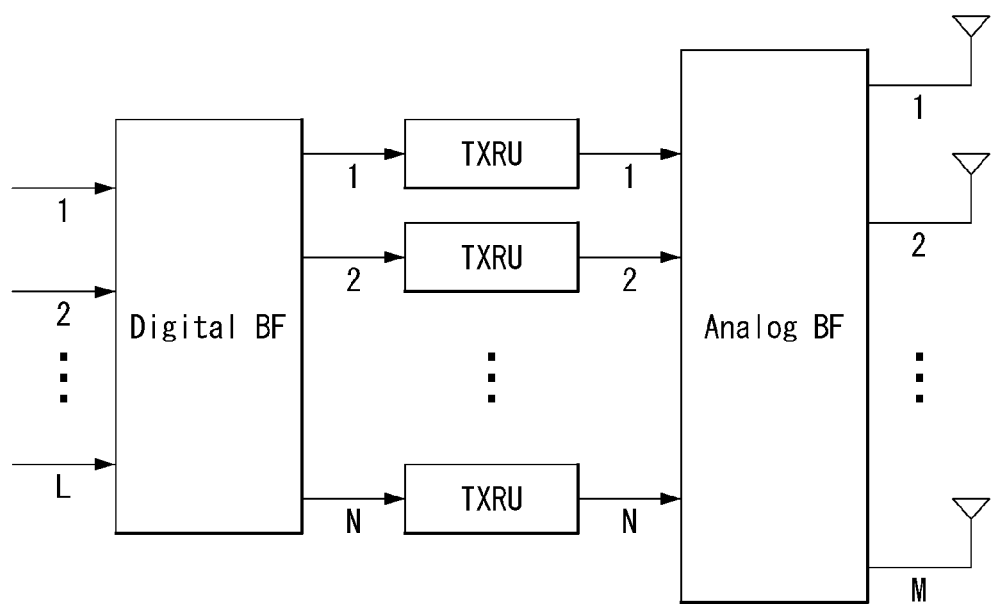
FIG. 15 is a diagram schematically illustrating a hybrid beamforming structure in the aspect of a TXRU and a physical antenna.

FIG. 15 is a diagram schematically illustrating a hybrid beamforming structure in the aspect of a TXRU and a physical antenna.

FIG. 15 exemplifies the case that the number of digital beams is L and the number of analog beams is N.

In the New RAT system, a direction has been considered: it is designed that an eNB may change the analog beamforming in a symbol unit, and more efficient beamforming is supported to a UE located in a specific area. Furthermore, when specific N TXRUs and M RF antennas shown in FIG. 15 are defined as a single antenna panel, in the New RAT system, the way of introducing a plurality of antenna panels has been also considered, to which independent hybrid beamforming may be applied.

In the case that an eNB utilizes a plurality of analog beams, an analog beam beneficial to receive a signal may be changed according to each UE. Accordingly, a beam sweeping operation has been considered that for at least synchronization signal, system information, paging, and the like, a plurality of analog beams that an eNB is going to apply in a specific Subframe (SF) is changed for each symbol such that all UEs have reception changes.

Figure 16:
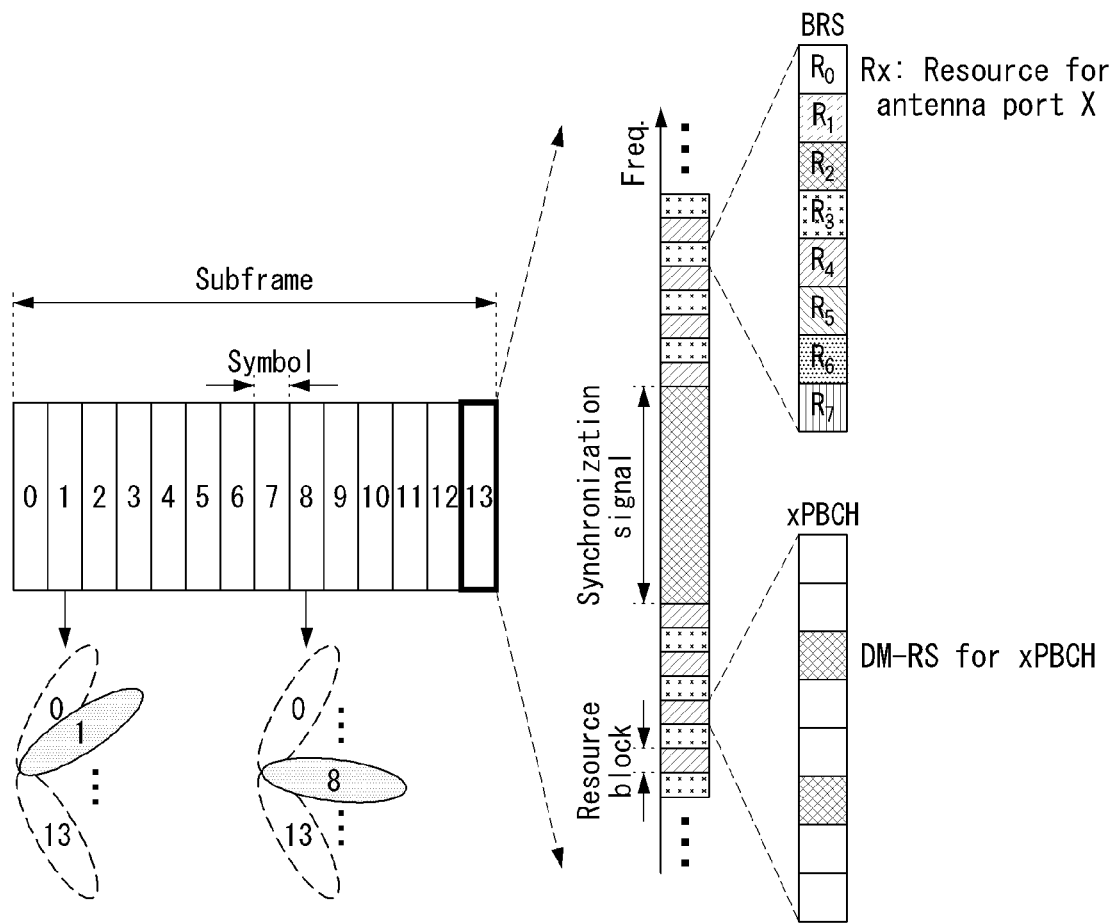
FIG. 16 is a diagram schematically illustrating a synchronization signal in DL transmission process and a beam sweeping operation for system information.

FIG. 16 is a diagram schematically illustrating a synchronization signal in DL transmission process and a beam sweeping operation for system information.

The physical resource (or physical channel) on which system information of the New RAT system is transmitted in FIG. 16 is referred to as x physical broadcast channel (xPBCH).

Referring to FIG. 16, the analog beams belonged to different antenna panels in a single symbol may be transmitted simultaneously. In order to measure a channel for each analog beam, as shown in FIG. 16, an introduction of a beam RS (BRS) has been discussed that a beam RS (BRS) is introduced, which is an RS to which a single analog beam (corresponding to a specific antenna panel) is applied and transmitted. The BRS may be defined for a plurality of antenna ports, and each antenna port of the BRS may correspond to a single analog beam. At this time, different from the BRS, a synchronization signal or xPBCH may be transmitted and all analog beams in an analog beam group may be applied so as to be received well by an arbitrary UE.

RRM Measurement in LTE

The LTE system supports an RRM operation for power control, scheduling, cell search, cell research, handover, radio link or connection monitoring, connection establishment/re-establishment, and so on. A serving cell may request RRM measurement information, which is a measurement value for performing an RRM operation to a UE. Representatively, in the LTE system, a UE may measure/obtain information such as reference signal received power (RSRP), reference signal received quality (RSRQ), and the like and report it. Particularly, in the LTE system, a UE receives 'measConfig' as a higher layer signal for an RRM measurement from a serving cell. The UE may measure RSRP or RSRQ according to the information of 'measConfig'. Herein, the definition of RSRP, RSRQ and RSSI according to TS 36.214 document of the LTE system is as follows.

1) RSRP

RSRP is defined as the linear average over the power contributions (in [W]) of the resource elements that carry cell-specific RS (CRS) within the considered measurement frequency bandwidth. For RSRP determination, the CRS R0 according TS 36.211 [3] shall be used. In the case that a UE may reliably detect that R1 is available, it may use R1 in addition to R0 to determine RSRP.

The reference point for the RSRP shall be the antenna connector of the UE.

In the case that receiver diversity is in use by the UE, the reported value shall not be lower than the corresponding RSRP of any of the individual diversity branches.

2) RSRQ

Reference Signal Received Quality (RSRQ) is defined as the ratio N×RSRP/(E-UTRA carrier RSSI) (i.e., E-UTRA carrier RSSI vs N×RSRP), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI) may include the linear average of the total received power (in [W]) observed only in OFDM symbols containing reference symbols for antenna port 0, in the measurement bandwidth, over N number of resource blocks by the UE from all sources (including co-channel serving and non-serving cells), channel interference, thermal noise, and the like. In the case that higher layer signaling indicates certain subframes for performing RSRQ measurements, the RSSI may be measured over all OFDM symbols in the indicated subframes.

The reference point for the RSRQ shall be the antenna connector of the UE.

In the case that receiver diversity is in use by the UE, the reported value shall not be lower than the corresponding RSRQ of any of the individual diversity branches.

3) [RSSI]

RSSI may correspond to the received wide band power including thermal noise and noise generated in a receiver within the bandwidth defined by the receiver pulse shaping filter.

The reference point for the measurement shall be the antenna connector of the UE.

In the case that receiver diversity is in use by the UE, the reported value shall not be lower than the corresponding UTRA carrier RSSI of any of the individual received antenna branches.

According to the definition, a UE operating in the LTE system may be allowed to measure RSRP in a bandwidth corresponding to one of 6, 15, 25, 50, 75, and 100 RB (resource block), through information element (IE) in relation to a measurement bandwidth transmitted in system information block type 3 (SIB3) in the case of an Intra-frequency measurement, and through an allowed measurement bandwidth transmitted in system information block type 5 (SIB5) in the case of an Inter-frequency measurement. Alternatively, in the case that the IE is not existed, the UE may measure in a frequency band of the whole DL system as default. At this time, in the case that the UE receives the allowed measurement bandwidth, the UE may regard the corresponding value as the maximum measurement bandwidth and may measure RSRP value freely within the corresponding bandwidth/value. However, in order for a serving cell to transmit the IE defined as wideband (WB)-RSRQ and configure the allowed measurement bandwidth to be 50 RBs or more, the UE shall calculate the RSRP value for the whole allowed measurement bandwidth. Meanwhile, the RSSI may be measured in the frequency band that a receiver of the UE has according to the definition of the RSSI bandwidth.

Figure 17:
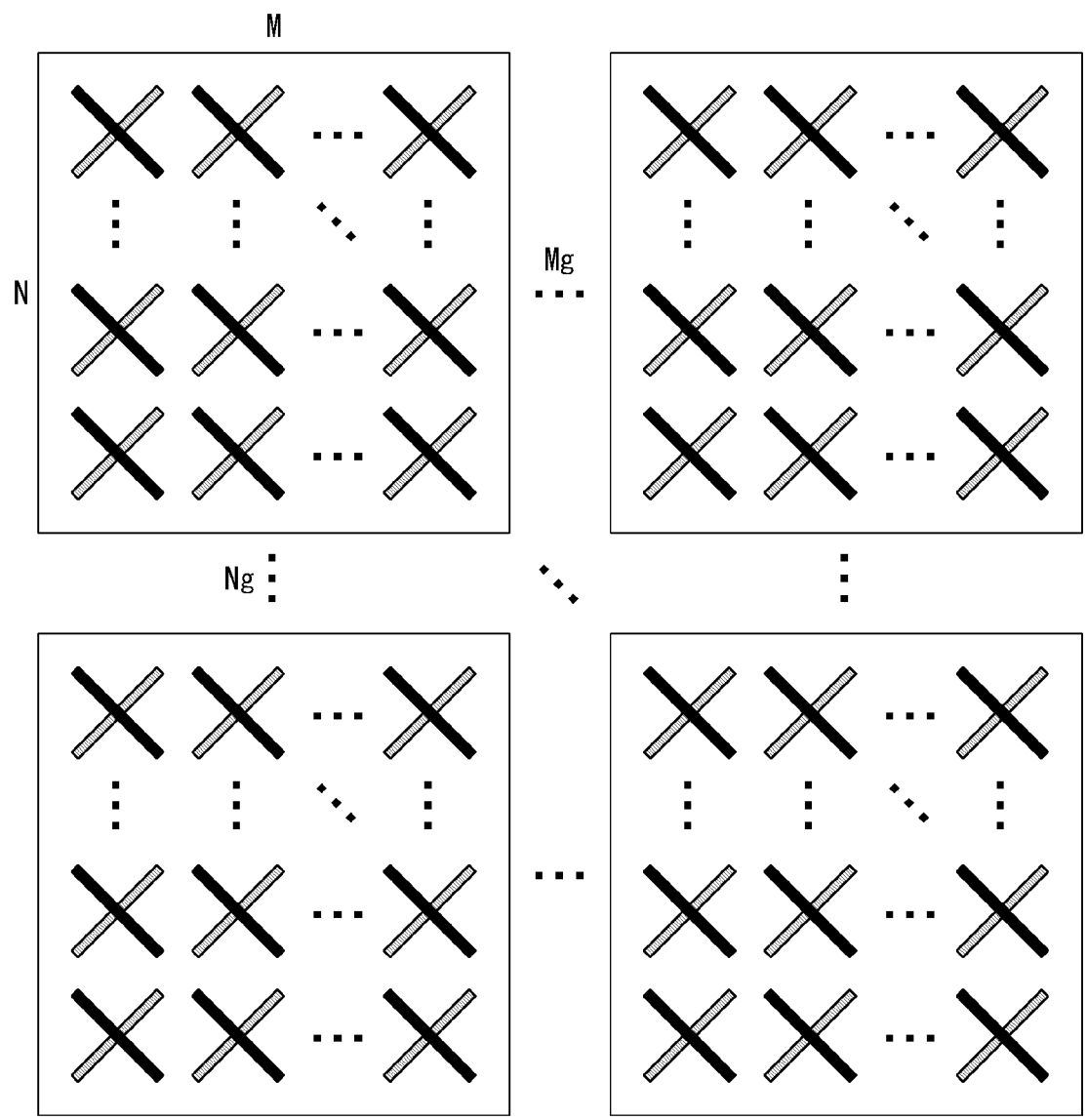
FIG. 17 illustrates a panel antenna array to which the present invention may be applied.

FIG. 17 illustrates a panel antenna array to which the present invention may be applied.

Referring to FIG. 17, a panel antenna array includes Mg number of panels in a horizontal domain and Ng number of panels in a vertical domain, and one panel may include M columns and N rows. Particularly, in this drawing, a panel is shown based on cross polarization (X-pol) antenna. Accordingly, the total number of antenna elements may be 2*M*N*Mg*Ng.

Method for Transmitting and Receiving Channel State Information

In the #89 conference of 3GPP RAN1 working group, it is agreed that the DL codebook configuration scheme follows R1-1709232 ("WF on Type I and II CSI codebooks"). In this document, it is described Type I codebook configuration scheme corresponding to a single panel (SP) (i.e., Type I single-panel codebook) having normal resolution and a multi panel (MP) (i.e., Type I multi-panel codebook) and Type II codebook configuration scheme based on linear combination.

Hereinafter, the codebook described in the present disclosure may include a codebook agreed to follow R1-1709232 ("WF on Type I and II CSI codebooks") and a codebook that may be configured with the similar principle.

In the present invention, in the case of using the codebook described above, hereinafter, a codebook subset restriction (CSR) method is proposed for the purpose of interference control between neighboring cells, mainly. The CSR means that an eNB restricts use of a specific precoder (i.e., specific PMI or specific beam) with respect to a specific UE. That is, a UE is restricted to report PMI, RI, PTI, and the like that correspond to one or more precoder (i.e., precoder codebook subset) which are specified by a CSR bitmap configured by an eNB. The CSR may be configured with a bitmap that indicates a specific precoder(s) (i.e., PMI) for each of different ranks in which a reporting of PMI, RI, PTI, and the like from a UE is restricted.

Hereinafter, in the description of the present invention, an antenna port in the text may be mapped to an antenna element according to virtualization of a TXRU, and is commonly called as a 'port' for the convenience of description.

Hereinafter, in the description of the present invention, it is described that 1-dimension/domain is referred to as horizontal dimension/domain mainly, and 2-dimension/domain is referred to as vertical dimension/domain mainly, in 2D antenna array, but the present invention is not limited thereto.

In addition, hereinafter, in the description of the present invention, unless otherwise described, the same variables used in each Equation may be represented by the same symbols, and also interpreted in the same manner.

Furthermore, hereinafter, in the description of the present invention, a beam may be interpreted as a precoding matrix (or precoding vector or codeword) for generating the corresponding beam, and a beam group may be interpreted as the same meaning as a set of precoding matrixes (or a set of precoding vectors).

The codebook subset restriction (CSR) supported in LTE is defined in Class A codebook of the similar property to Type I codebook.

This may be indicated to a UE as a bitmap configured for each beam index+rank (N1*O1*N2*O2+8) and for each W2 index (codebook config 1: 4(bit)+4(bit)+2(bit)+2(bit)/codebook config 2-4: 16(bit)+16(bit)+16(bit)+8(bit)). That is, each of the bits configuring a bitmap indicating the CSR is in relation to a codebook index and/or a precoder for a specific layer. In the case that a codebook index is configured with i_1 (a first PMI, W1) and i_2 (a second PMI, W2), the bitmap for indicating the CSR may include bits related to a precoder for codebook index i_1 (a first PMI, W1) and/or a specific layer and bits related to a precoder for codebook index i_2 (a second PMI, W2) and/or a specific layer.

That is, when an index for a specific (multiple) codebook beam (precoder) is transmitted from an eNB as a bitmap (i.e., in a bitmap, when a bit value corresponding to an index for a specific (multiple) codebook beam (precoder) is zero), the UE does not consider the codebook used by the beam (precoder) when performing a CSI reporting (feedback) (i.e., reporting of PMI, RI, PTI, etc. corresponding to a specific beam (precoder) is restricted). In addition, the UE also does not report a specific rank transmitted to the CSR for each rank when performing a CSI feedback.

Here, N1 is the number of first domain (dimension) antenna ports, N2 is second domain (dimension) antenna ports, o1 is a first domain (dimension) oversampling factor and o2 is a second domain (dimension) oversampling factor.

[Type I Codebook]

Embodiment 1

In Type 1 SP (Single Panel) codebook, when configuring a codebook of a UE configured with 16-port or more, the CSR for two inter-group co-phase {e.g., 1, exp(j*1 pi/4), exp(j*2 pi/4), exp(j*3 pi/4) and/or exp(j*pi/4), exp(j*3 pi/4), exp(j*5 pi/4), exp(j*7 pi/4)} components for each of an identical polarization may be configured/applied. Herein, exp( ) means an exponential function, j means a unit of imaginary number and pi means π.

In 16-port or more of SP Type 1 codebook, rank 3-4 codebook is configured with 2 Dimensional (2D) (or 1 Dimensional (1D)) Discrete Fourier Transform (DFT) Grid of Beam (GoB) which is divided into two antenna port groups for each of an identical polarization in a single-panel.

That is, each antenna port group includes DFT beams having (N1*N2/2)-length (in a single antenna port group, N1*N2/2 DFT beams (precoder) are included). Each of the beam (precoder) may be represented as $$b_l \in C^{\frac{N_1 N_2}{2} \times 1}\left(l = 0, 1, \ldots \frac{N_1 N_2 O_1 O_2}{2} - 1\right).$$

The final precoding beam (precoding matrix) for an identical polarization is represented as $$v_i = \begin{bmatrix} b_i \\ c_i b_i \end{bmatrix}.$$

Here, $c_i$ is {1, exp(j*1 pi/4), exp(j*2 pi/4), exp(j*3 pi/4)} value.

Accordingly, the number of beams represented in rank 3-4 of 16 port or more is $$\frac{N_1 N_2 O_1 O_2}{2} * 4 = 2 N_1 N_2 O_1 O_2.$$

Accordingly, a bitmap size is determined as $$\text{bitmap\_size} = \begin{cases} 2 N_1 N_2 O_1 O_2 & \text{for rank 3 and 4} \\ N_1 N_2 O_1 O_2 & \text{otherwise} \end{cases}.$$

As such, there is a problem that a bit size for performing the CSR is changed for each beam according to a rank.

In order to solve the problem, the following alternatives (Alts) may be considered.

In addition, as shown in the example above, in the case that inter-group co-phase of {1, exp(j*1 pi/4), exp(j*2 pi/4), exp(j*3 pi/4), exp(j*pi/4), exp(j*3 pi/4), exp(j*5 pi/4), exp(j*7 pi/4)} is used, a bitmap may be used of which size is $$\text{bitmap\_size} = \begin{cases} 8N_1N_2O_1O_2 & \text{for rank 3 and 4} \\ N_1N_2O_1O_2 & \text{otherwise} \end{cases}.$$

Alt. 1: Accordingly, the CSR for each beam may be defined as a bitmap of $2N_1N_2O_1O_2$ ($N_1N_2O_1O_2+2N_1N_2O_1O_2$) (the number of states of $c_i$ is 4) or $4N_1N_2O_1O_2$ ($N_1N_2O_1O_2+2N_1N_2O_1O_2$) (the number of states of $c_i$ is 8). In addition, 8-bitmap for each rank is used, and the CSR for each beam and the CSR for each rank may be encoded independently or integrally.

Alt. 2: Alternatively, the CSR for each beam may be separately defined for each rank, and the CSR may be configured such that the rank group that shares the same beam group is distinguished with 1 bit indicator. Accordingly, a bitmap size may be or $$\text{bitmap\_size} = \begin{cases} 1 + 2N_1N_2O_1O_2 + 2 & \text{for rank 3 and 4} \\ 1 + N_1N_2O_1O_2 + 6 & \text{otherwise} \end{cases}$$

$$\text{bitmap\_size} = \begin{cases} 1 + 3N_1N_2O_1O_2 + 2 & \text{for rank 3 and 4} \\ 1 + N_1N_2O_1O_2 + 6 & \text{otherwise} \end{cases}.$$

In Alt. 2 above, 1 bit of the first term is an indicator for distinguishing different ranks from rank 3-4 (e.g., rank 3-4 is indicated when a bitmap value is '0', and other ranks are indicated when a bitmap value is '1'). The second term is a coefficient of a beam used for each rank group. The third term is the number of ranks in each rank group, 2 is a bit number for distinguishing ranks 3, 4 and 6 is a bit number for distinguishing ranks 1, 2, 5, 6, 7 and 8.

In order to reduce signaling overhead for a bitmap for each rank, a size of bitmap for each rank may be configured based on a capability reporting of UE. For example, in the case that a UE is able to process up to 4 layer, the size of bitmap for each rank is 4, and in the case of Alt. 2, a bitmap size may be $$\text{bitmap\_size} = \begin{cases} 1 + 2N_1N_2O_1O_2 + 2 & \text{for rank 3 and 4} \\ 1 + N_1N_2O_1O_2 + 2 & \text{for rank 1 and 2} \end{cases}.$$

Hereinafter, for the alternative described below, a CSR bit size allocation according to capability reporting of UE may also be extendedly applied apparently.

Alternatively, except the group-cophase, it may be configured that only DFT beam is restricted such as $$\text{bitmap\_size} = \begin{cases} N_1N_2O_1O_2/2 & \text{for rank 3 and 4} \\ N_1N_2O_1O_2 & \text{otherwise} \end{cases}.$$

Alt. 2-1: The CSR for rank 3-4 may be indicated by the union of a bitmap of an index for each beam (precoder) and a bitmap of panel co-phase index (i.e., concatenation of two bitmaps), and a UE may not report the beam to which the corresponding CSR is configured and the co-phase index when performing a CSI feedback. Accordingly, a bitmap size is $$\text{bitmap\_size} = \begin{cases} 1 + \frac{1}{2}N_1N_2O_1O_2 + 4 + 2 & \text{for rank 3 and 4} \\ 1 + N_1N_2O_1O_2 + 6 & \text{otherwise} \end{cases}.$$

In Alt. 2-1, in rank 3 and 4, the second and the third terms $$\frac{1}{2}N_1N_2O_1O_2 + 4$$

is the number of beams ($b_i$) and herein, 4 (bit) corresponds to bitmap for inter-panel co-phase.

The case of Alt. 2-1, in comparison with other alternatives, there is an advantage that feedback overhead for rank 3-4 may be significantly reduced.

As another scheme, except for group-cophase, by configuring one bit-field corresponding to all ranks, a beam restriction (i.e., CSR) may be performed. That is, CSR bit-field of Type I CSI may be provided with $N_1N_2O_1O_2$, the DFT-beam for all ranks may be CSR. In other words, a bitmap of $N_1N_2O_1O_2$ length for CSR indication may be commonly applied to all ranks without regard to a rank.

However, for rank 3-4, a problem occurs for applying $N_1N_2O_1O_2/2$ efficiently. In order to solve the problem, Type I codebook will be described first.

Equation 15 below exemplifies Type I codebook.

$$\varphi_n = e^{j\pi n/2} \quad [\text{Equation 15}]$$

$$\theta_p = e^{j\pi p/4}$$

$$u_m = \begin{cases} \begin{bmatrix} 1 & e^{j\frac{2\pi m}{O_2N_2}} & \cdots & e^{j\frac{2\pi m(N_2-1)}{O_2N_2}} \end{bmatrix} & N_2 > 1 \\ 1 & N_2 = 1 \end{cases}$$

$$v_{l,m} = \begin{bmatrix} u_m & e^{j\frac{2\pi l}{O_1N_1}}u_m & \cdots & e^{j\frac{2\pi l(N_1-1)}{O_1N_1}}u_m \end{bmatrix}^T$$

$$\tilde{v}_{l',m} = \begin{bmatrix} u_m & e^{j\frac{4\pi l'}{O_1N_1}}u_m & \cdots & e^{j\frac{4\pi l'(N_1/2-1)}{O_1N_1}}u_m \end{bmatrix}^T$$

In Equation 15, $\varphi_n = e^{j\pi n/2}, \theta_p = e^{j\pi p/4}$ is group-cophase for codebook configuration for rank 3 and 4, respectively. $u_m$ denotes a DFT vector of N2 domain, $\tilde{v}_{l',m}$ denotes a DFT vector of N1 domain in rank 3-4, and $v_{l,m}$ denotes a DFT vector of N1 domain except rank 3-4.

In describing mathematical expressions for $\tilde{v}_{l',m}$ and $v_{l,m}$ when 1 value of $v_{l,m}$ is even number, from the first term of $v_{l,m}$, N1N2/$2^{th}$ element includes $\tilde{v}_{l',m}$.

Accordingly, in the case that the CSR is performed by $v_{l,m}$, where l=0, ..., $O_1N_1-1$, m=0, ..., $O_2N_2-1$ as a bit-field of $N_1N_2O_1O_2$, when the even number of DFT beams in N1 domain is restricted, the DFT beam in N1 domain corresponding to $$\tilde{v}_{l',m} = 0, 1, \ldots \frac{N_1O_1}{2} - 1$$

that corresponds 3-4 may be restricted simultaneously. In other words, when $v_{2i,m}$ is restricted, a UE may interpret that $\bar{v}_{i,m}$ is restricted.

Figure 18:
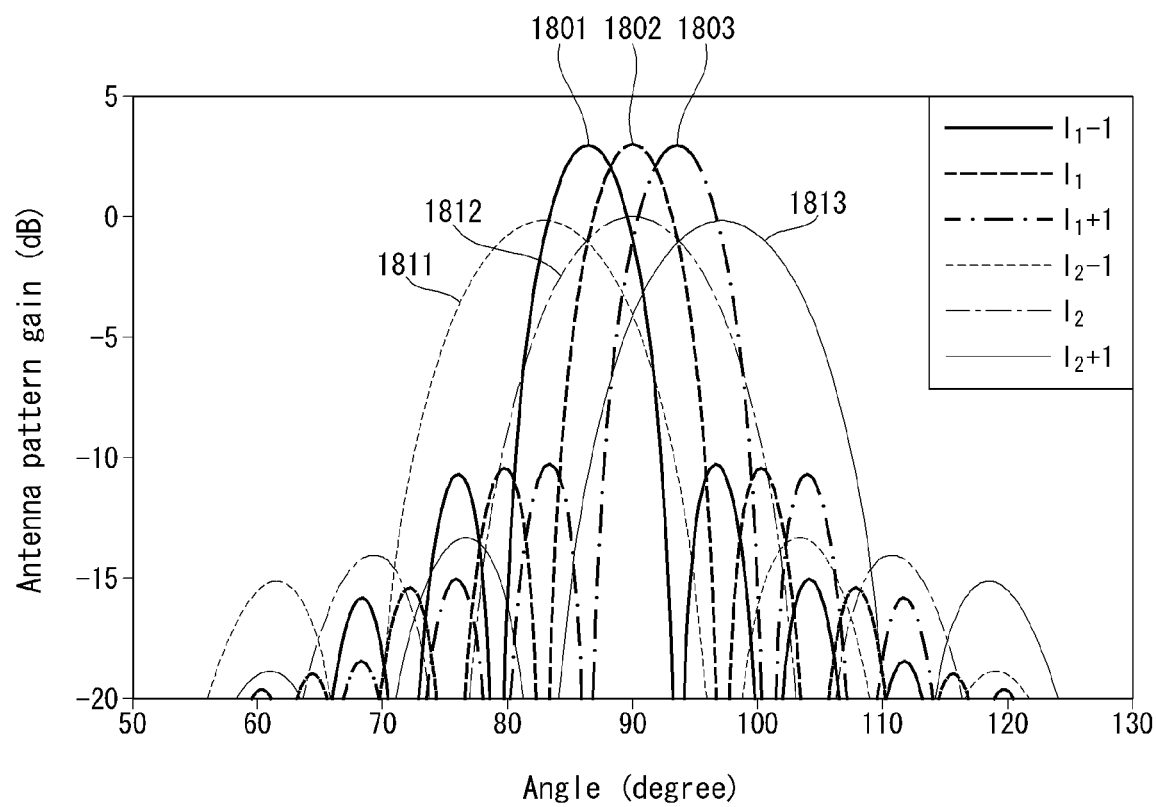
FIG. 18 illustrates an antenna pattern gain when the codebook subset restriction is applied according to an embodiment of the present invention.

FIG. 18 illustrates an antenna pattern gain when the codebook subset restriction is applied according to an embodiment of the present invention.

In FIG. 18, the antenna pattern gain of 32-port (N1=16, N2=1) is exemplified. FIG. 18 shows the case of $l_1=1, l_2=1'$.

Referring to FIG. 18, bold lines (1801, 1802 and 1803) represent $v_{l,m}$ and fine lines (1811, 1812 and 1813) represent $\bar{v}_{l',m}$.

As shown in FIG. 18, since the number of ports of $v_{l,m}$ is two times of $\bar{v}_{l',m}$, 3 dB beam width is about a half, and owing to this, the beam of $v_{l,m}$ corresponding to odd number l value is located between two neighboring $\tilde{v}_{l',m}$ beams.

For example, $v_{l_1-1,m}$ is located between beams of $\tilde{v}_{l_2-1,m}$, $\tilde{v}_{l_2,m}$. Accordingly, when $v_{l,m}$ corresponding to odd number l=2i+1 value is restricted, it may be predefined (or promised between an eNB and a UE) that two beams corresponding to $\tilde{v}_{i,m}$ and $\tilde{v}_{i+l,m}$ are restricted simultaneously. And/or, as the same way as the proposal above, when $v_{2i,m}$ corresponding even number l=2i value is restricted, a UE may interpret that $\tilde{v}_{i,m}$ is restricted. In this case, since a specific beam may be restricted twice simultaneously depending on l value, a UE may interpret that the corresponding $\tilde{v}_{i,m}$ is restricted when $\tilde{v}_{i,m}$ is restricted one or more times with $v_{l,m}$.

In other words, except for the case that the number of antenna ports for transmitting CSI-RS is 16 or more and the number of layers (or ranks) (associated with the RI that a UE reports in the CSI) is 3 or 4, a bit of bitmap is associated with each precoder. Referring to FIG. 18, a first beam (precoder) 1801, a second beam (precoder) 1802 and a third beam (precoder) 1803 are associated with one bit of bitmap of $N_1N_2O_1O_2$, respectively. Accordingly, when the CSR is indicated in a specific bit (e.g., a specific bit value is '0'), a reporting of the PMI corresponding to the beam (precoder) which is associated with the corresponding bit is not allowed (restricted).

On the contrary, in the case that the number of antenna ports for transmitting CSI-RS is 16 or more and the number of layers (or ranks) (associated with the RI that a UE reports in the CSI) is 3 or 4, multiple bits of $N_1N_2O_1O_2$ bitmap may be associated with each precoder. Referring to FIG. 18, in the case that the number of antenna ports for transmitting CSI-RS is 16 or more and the number of layers (or ranks) is 3 or 4, each of three bits may be associated with each beam (precoder) 1811, 1812 and 1813. For example, except for the case that the number of antenna ports for transmitting CSI-RS is 16 or more and the number of layers (or ranks) is 3 or 4, three bits of the bit associated with the first beam (precoder) 1801, the bit associated with the second beam (precoder) 1802 and the bit associated with the third beam (precoder) 1803 may be associated with the fifth beam (precoder) 1812, when the number of antenna ports for transmitting CSI-RS is 16 or more and the number of layers (or ranks) is 3 or 4. According to this method, the bit associated with the first beam (precoder) 1801 may also be associated with the fourth beam (precoder) 1811, and also associated with the fifth beam (precoder) 1812. Accordingly, when the CSR is indicated in the bit associated with the first beam (precoder) 1801 (e.g., when the corresponding bit value is '0'), the CSR may be applied to both of the fourth beam (precoder) 1811 and the fifth beam (precoder) 1812. That is, as described above, when $v_{l,m}$ corresponding to odd value l=2i+1 is restricted, two beams corresponding to $\tilde{v}_{i,m}$ and $\tilde{v}_{i+1,m}$ may be restricted simultaneously.

In addition, as described above, depending on l value, a specific beam may be restricted twice simultaneously. That is, even in the case that $v_{i,m}$ corresponding to odd value l=2i+1 is restricted and also, in the case that $v_{l,m}$ corresponding to odd value l=2i+1 is restricted, $\tilde{v}_{i,m}$ may be restricted. Referring to FIG. 18, since the bit associated with the first beam (precoder) 1801, the bit associated with the second beam (precoder) 1802 and the bit associated with the third beam (precoder) 1803 may be associated with one fifth beam (precoder) 1812, when the CSR is indicated to any one bit of the bit associated with the first beam (precoder) 1801, the bit associated with the second beam (precoder) 1802 and the bit associated with the third beam (precoder) 1803 (e.g., when bit value is '0'), the CSR may also be applied to the fifth beam (precoder) 1812.

Furthermore, as described above, in the description of FIG. 18 above, in the case that the number of antenna ports for transmitting CSI-RS is 16 or more and the number of layers (or ranks) is 3 or 4, multiple bits may include three bits. At this time, indexes of the three bits may have a multiple relation of a specific number (e.g., N_2*O_2). At this time, the bits belong to a bitmap for CSR configuration may be indexed sequentially from zero, from LSB (Most Significant Bit) to MSB (Most Significant Bit).

In addition, as described above, for example, $v_{l_1-1,m}$ is located between beams of $\tilde{v}_{l_2-1,m}, \tilde{v}_{l_2,m}$. Accordingly, when $v_{l,m}$ corresponding to odd number l=2i+1 value is restricted, it may be predefined (or promised between an eNB and a UE) that two beams corresponding to $\tilde{v}_{i,m}$ and $\tilde{v}_{i+1,m}$ are restricted simultaneously. And/or, as the same way as the proposal above, when $v_{2i,m}$ corresponding even number l=2i value is restricted, a UE may interpret that is restricted. In other words, the bits in the bitmap for CSR configuration may belong to one or multiple bit units. For example, in the bitmap constructed by a_n, . . . , a_0, a_40 may belong to both of multiple bit units constructed by (a_24, a_32, a_40) and multiple bit units constructed by (a_40, a_48, a_56). In addition, a_48 may belong to multiple bit units constructed by (a_40, a_48, a_56). Accordingly, when the CSR is indicated to either one of bit in the bitmap for CSR configuration, depending on whether the multiple bit units to which this bit belongs is 1 or multiple numbers, a reporting of the PMI corresponding to a single precoder may be restricted (in the case that $\tilde{v}_{i,m}$ is restricted when $v_{2i,m}$ corresponding to even number l=2i value is restricted) or a reporting of the PMI corresponding to multiple precoders may be restricted (in the case that two beams corresponding to $\tilde{v}_{i,m}$ and $\tilde{v}_{i+1,m}$ are restricted when $v_{l,m}$ corresponding to odd number l=2i+1 value is restricted).

Alternatively, it may be predefined (or promised between an eNB and a UE) that only either specific one (e.g., $\tilde{v}_{i,m}$) of two beams corresponding to $\tilde{v}_{i,m}$ and $\tilde{v}_{i+1,m}$ is restricted when $v_{l,m}$ corresponding to odd number l=2i+1 value is restricted. As described above, in the example described above, when the CSR is indicated to the bit associated with the first beam (precoder) 1801 (e.g., when the corresponding bit value is '0'), the CSR may be applied to either one of beam (precoder) among the fourth beam (precoder) 1811 and the fifth beam (precoder) 1812, which is associated with the corresponding bit. At this time, it may be informed to a UE by higher layer signaling (e.g., RRC signaling) on which beam between $\tilde{v}_{i,m}$ and $\tilde{v}i+1,m$ is restricted. In other words, in the example of FIG. 18, in the case that the number of antenna ports for transmitting CSI-RS is 16 or more and the number of layers (or ranks) is 3 or 4, each of three bits may be associated with the fourth beam (precoder) 1811, the fifth beam (precoder) 1812 and the sixth beam (precoder) 1813. At this time, only when the CSR is indicated in a specific bit among three bits, a reporting of the PMI corresponding to the beam (precoder) associated with it may be restricted.

Alternatively, when $V_{i,m}$ corresponding to odd number l=2i+1 value is restricted, it may be predefined (or promised between an eNB and a UE) that a beam in which $\tilde{v}_{l',m}$ is coupled with a specific $\theta_p = e^{j\pi p/4}$ is restricted. It is predefined (or promised between an eNB and a UE) that $[\tilde{v}_{l',m} \ \theta_p \bar{v}_{l',m}]$ is restricted, and an eNB may inform $\theta_p = e^{j\pi p/4}$ to a UE by higher layer signaling (e.g., RRC signaling) or inform to a UE by a separate bitmap from the CSR.

Embodiment 2

When configuring a codebook of a UE configured with Multi Panels (MP) codebook, the CSR for inter-panel co-phase (e.g., {1,j,−1,−j} and/or {exp(j*pi/4), exp(j*3 pi/4), exp(j*5 pi/4), exp(j*7 pi/4)} and/or {exp(j*pi/4), exp(j*3 pi/4), exp(j*5 pi/4), exp(j*7 pi/4)}*{exp(−j*pi/4), exp(j*pi/4)}) element for each polarization may be configured/applied.

Type 1 multi panel (MP) codebook is identically configured/applied for each panel with a single pattern codebook, and configured with a codebook to which inter-panel co-phase is added. Herein, Ng is the number of panel, N1 and N2 are the number of antenna ports of a first domain and a second domain in a panel, respectively. Accordingly, each panel includes $N_1 N_2 O_1 O_2$ number of 2D or 1D DFT beams and in the case of considering all of panel co-phase, a length of precoding beam for each polarization is Ng*N1*N2.

For panel co-phase, according to the mode defined in R1-1709232 ("WF on Type I and II CSI codebooks"), in the case of mode 1 (panel co-phase {1, j, −1, −j} only for Wide Band (WB)), by using co-phase of 4 states, the number of final precoding beams becomes $4^{(N_g-1)} N_1 N_2 O_1 O_2$. In addition, a bitmap size of CSR for each beam using this becomes $4^{(N_g-1)} N_1 N_2 O_1 O_2$. In the case of mode 2 (WB+Sub-Band (SB) panel co-phase), panel co-phase with WB is independently performed for polarization, and there may be more number of total WE codebooks, but the number of final DFT beams for each polarization is the same as $4^{(N_g-1)} N_1 N_2 O_1 O_2$. Accordingly, for MP codebook, the CSR of WB beam for each polarization and the CSR for each rank may be configured with a bitmap of $4^{(N_g-1)} N_1 N_2 O_1 O_2 + 4$ regardless of mode, and a beam and a rank may be configured with independent field similar to embodiment 1 described above.

Embodiment 2-1

Panel common DFT beam and panel co-phase may be configured with separate CSR fields.

Since the number of $4^{(N_g-1)} N_1 N_2 O_1 O_2$ may becomes significantly increased according to Ng value, a bitmap of $N_1 N_2 O_1 O_2 + 4$ may be configured by configuring the CSR for a beam index and the CSR field for co-phase separately. In this case, a UE operates such that final WB precoding beam for each polarization corresponding to union of two fields is not reported when performing CSI feedback. In embodiment 2-1 described above, a beam (final Ng*N1*N2-length beam)+CSR for each rank may be performed, and a beam and a rank may be configured with independent fields similar to embodiment 1 described above.

Embodiment 2-2

The CSR for each beam may be configured by considering panel-common DFT beam, and WB co-phase and SB co-phase.

Considering SB panel co-phase in MP codebook mode 2 additionally, total bitmap size of the final Ng*N1*N2-length precoding beam for each polarization configured based on DFT becomes $4^{(N_g-1)} 2^{(N_g-1)} N_1 N_2 O_1 O_2$, and the UE configured with MP mode 2 performs the CSR for each beam using bitmap of $4^{(N_g-1)} 2^{(N_g-1)} N_1 N_2 O_1 O_2$ or performs the CSR for each beam+rank using bitmap of $4^{(N_g-1)} 2^{(N_g-1)} N_1 N_2 O_1 O_2 | 4$.

Embodiment 2-2-1

The panel-common DFT beam, and WB co-phase and SB co-phase may be configured with an independent CSR field.

Similar to embodiment 2-1 described above, as Ng increases, since a size of total bitmap increases significantly, in order to prevent it, by configuring CSR with separate fields of the panel-common DFT beam, and WB co-phase and SB co-phase, bitmap CSR of $N_1 N_2 O_1 O_2 + 4 + 2$ may be performed. Here, '4' represents a state of WB co-phase and '2' represents a state of SB co-phase. In this case, a UE operates so as not to report the final precoding beam for each polarization that corresponds to the union of three fields when performing CSI feedback.

The embodiment described above may be apparently extended to the case that a beam selection (codebook selection) is applied independently between panels.

Embodiment 3

Multiple codebook configuration factors are existed (e.g., W1 index and W2 index of dual stage codebook), and when these configuration factors are configured with different CSR fields, an eNB may inform whether the CSR is configured with the union or the intersection of these CSR fields to a UE with 1 bit indicator.

The dual stage codebook may be configured with different fields for the purpose of reducing overhead of the codebook factor (e.g., beam index) corresponding to W1 and the codebook factor (e.g., beam selector and/or co-phase) corresponding to W2. In this case, when two fields are down to a UE simultaneously, the existing UE operates so as not to report the codebook index that corresponds to the union indicated by the two fields when performing CSI feedback. However, when a UE operates with the union only, since the codebook constituent elements may be restricted aggressively, actual performance of UE may be degraded.

In order to prevent such a problem, as a method for informing only the elements that require the CSR to a UE in pin-point manner, the CSR may be performed with an intersection of multiple CSR fields. Accordingly, when an eNB informs multiple CSR fields to a UE, the eNB may inform whether the CSR is performed with the union or the intersection of these fields to a UE with 1 bit indicator. Alternatively, an eNB may inform an interpretation of multiple CSR fields to a UE by using a bitmap to which bits (K-bits) is allocated as much as the multiple number (K number) of fields.

[Type II Codebook]

Type II codebook is configured by linearly combining (LC) selected the DFT beams of 2D or 1D L (L=2, 3 and 4) DFT beams which are orthogonal with independent amplitude and coefficient of phase for each layer for each polarization, respectively. Accordingly, for the factor that may be used for the purpose of controlling inter-cell interference among the elements of the LC codebook, the number ($N_1 N_2 O_1 O_2$) of DFT beams and the coefficient (size/phase) of each beam which are linearly combined.

Among the linearly combined beams, in the case that one or multiple beam(s) indicated by the CSR is (are) selected among the (2L) candidates of the beams which are linearly combined, with respect to the corresponding beam(s), a UE may configure a codebook by configuring/applying zero for amplitude coefficients always. In the case that power control is performed by turning on/off the beams indicated by the CSR for the purpose of interference management and the like, there is an effect of preventing interference perfectly. However, the UE that reports the corresponding beam with the most preferred beam is unable to select the corresponding beam, and accordingly, the performance may be degraded.

Embodiment 4

The index of linearly combined beam(s) and/or the degree of power-level of the corresponding beam(s) (e.g., amplitude coefficient) may be indicated with the CSR.

In embodiment 4, for the purpose of soft power control for inter-cell interference, the index of linearly combined beam(s) and/or the degree of power-level (e.g., amplitude coefficient) are indicated with the CSR. In the case that $N_1N_2O_1O_2$, DFT beams configuring the LC codebook are existed and the number of amplitude power coefficients are defined as SA, the CSR may be indicated by using the bitmap of $N_1N_2O_1O_2+SA$ or $S_A N_1 N_2 O_1$, similar to embodiments 1, 2 and 3. The former case has an advantage that there is great effect of signal overhead saving. Alternatively, only the maximum allowed power level may be indicated, and in this case, overhead may be reduced by using the indicator of $[\log_2 S_A]$-bit, not a bitmap.

Embodiment 4 described above may also be used for Type I codebook as well as Type II codebook, and used in the process of computing the best preferred PMI, and accordingly, the CSI (e.g., RI, PMI, CQI, CSI-RS resource indicator (CRI), etc.) may be computed.

Embodiment 5

In the case that beamforming (e.g., analog and/or digital) is performed for each port or port group like class B of LTE, the CSR may be indicated by using the bitmap of M (e.g. $M=N_1N_2$# of port or port group).

This embodiment may be applied to the case of using the CSI-RS to which beamforming (e.g., analog and/or digital) for each port or port group is applied like class B of LTE, and the CSR may be indicated to an eNB using the bitmap using M bits or M+R bits (here, R is the maximum rank) for the CSR for each port.

In addition, in the case of embodiment 5, in combination with embodiment 4 described above, the CSR for the purpose of soft power control for each port may be performed. In the case that multiple number (K) of CSI-RS resources is indicated, a bitmap may be extendedly applied to KM or K+M. In the case of KM, whereas it is easy to indicate with the CSR in pin-point manner among total KM ports, overload is great. And in the case of K+M, whereas overload is reduced, the number of ports that needs to be applied with the CSR becomes greater excessively.

Such CSR information may be indicated for each CSI process by being included in CSI-RS resource setting or indicated to a UE by separate higher layer signaling (e.g., RRC signaling).

In the case that the case of LC codebook (R1-1709232) applied in a beamformed CSI-RS described below is used, embodiment 5 and embodiment 4 described above may be combined and applied. That is, the CSR may be performed in combination or independently of combining amplitude coefficients coupled with the part for port-group or port selection.

The LC codebook applied in the beamformed CSI-RS will be described.

In NR, it is supported an extension of Type II Category (Cat) 1 CSI for ranks 1 and 2 like Equation 16 below.

$$W_1 = \begin{bmatrix} E_{\frac{X}{2} \times L} & 0 \\ 0 & E_{\frac{X}{2} \times L} \end{bmatrix}$$ [Equation 16]

In Equation 16, X is the number of CSI-RS port(s). L value may be configurable (L □ {2, 3, 4}).

Available value of X follows Type II SP codebook as represented in Equation 17 below.

$$E_{\frac{X}{2} \times L} = \begin{bmatrix} e^{(\frac{X}{2})}_{mod(md,\frac{X}{2})} & e^{(\frac{X}{2})}_{mod(md+1,\frac{X}{2})} & \cdots & e^{(\frac{X}{2})}_{mod(md+L-1,\frac{X}{2})} \end{bmatrix}$$ [Equation 17]

In Equation 17, $$e_i^{(\frac{X}{2})}$$

is a vector of which length is $$\frac{X}{2},$$

of which ith component is 1 and other components are 0. The port selection m value is determined within $$m \in \left\{ 0, 1, \ldots, \left\lceil \frac{X}{2d} \right\rceil - 1 \right\},$$

Wide Band $$\left\lceil \log_2\left(\frac{X}{2d}\right) \right\rceil$$

bit is used for a computation and a reporting of m. Value of d may be configurable (d □ {1, 2, 3, 4} under the condition of $$d \leq \frac{X}{2}$$

and d≤L).

The amplitude scaling and the phase combining coefficients follow Type II SP codebook together with these configurations.

Embodiment 6

In the case that a bit-width of the codebook generated as a result in the multiple CSR fields (e.g., W1 index, R1, W2 index and DFT beam index) indicated with the CSR may be decreased, for the corresponding CSI feedback, CSI may be reported by remapping an index with the decreased bit-width.

For example, a rank indicator is described. In the case that a UE reports that the UE may report rank 8 with the capability and 8-bit rank CSR bitmap (i.e., bitmap for rank restriction configuration) is indicated with "00001111" (here, it is assumed that '0' means no CSR and '1' means CSR, and bits correspond rank 1, . . . , 8 from the most significant bit sequentially), the UE maps RI with 2 bits, not 3 bits, and feedback overhead may be reduced. That is, since the number of RIs in which a reporting is allowed in rank CSR bitmap "00001111" is 4 (there are four '0' values in the above example), the bit-width for RI reporting may be determined with 2 bits, and accordingly, RI feedback overhead may be reduced.

As another example, it is assumed that W2 index CSR bitmap of configuration (config) 2 rank 1 is configured with "0101" and corresponds to 1, j, −1, −j from the most significant bit. In this case, in the case that a preferred PMI of a UE is rank 1, for W2, SB CSI feedback may be reported with 1 bit co-phase, not 2 bits. In the 1 bit co-phase, an eNB and a UE may interpret that "0" state of 1 bit is remapped to '1' and "1" state is remapped to '−1'.

Figure 19:
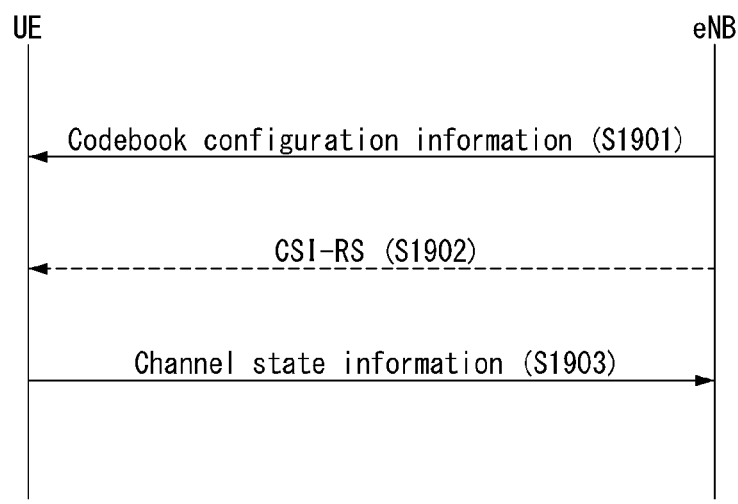
FIG. 19 is a diagram illustrating a method for transmitting and receiving channel state information according to an embodiment of the present invention.

FIG. 19 is a diagram illustrating a method for transmitting and receiving channel state information according to an embodiment of the present invention.

Referring to FIG. 19, a UE receives codebook configuration information from an eNB (step, S1901).

Here, the codebook configuration information may include a bitmap for CSR configuration and/or a bitmap for rank restriction configuration.

The bitmap for CSR configuration and/or the bitmap for rank restriction configuration may be configured according to the embodiments of the present invention described above.

For example, the bitmap for CSR configuration may use different bit fields (i.e., bitmaps configured with different bit-widths) for the case that the number of antenna configured to a UE is 16 or more (e.g., 16, 24, 32, 64, etc.) and the number of layers (or rank) (this is associated with the RI reported in CSI) is 3 or 4, and for the case otherwise, respectively.

Alternatively, the bitmap for configuring the CSR is commonly applied without regard to the number (this is associated with the RI reported in CSI) of layers associated with the rank indicator (RI) in the CSI. Without regard to the number of antenna ports configured to a UE and/or the number (this is associated with the RI reported in CSI) of layers, a common bit field (i.e., a single bitmap) may be used. As such, in the case that a common bitmap is used without regard to the number of layers (or ranks), as described above, since the antenna ports of a single panel is distinguished by 2 when the number of layers (or ranks) of 16 ports or more is 3 or 4, even in the case that the common bitmap is used, an application (interpretation) method may be changed depending on the number of layers (or ranks).

The UE may receive a CSI-RS on one or more antenna ports from the eNB (step, S1902).

In addition, although it is not shown in FIG. 19, the UE may receive configuration information of the number of antenna ports for configuring codebook from the eNB. That is, the UE may receive each of the information for the number (N_1) of first domain antenna ports and the number (N_2) of second domain antenna ports. In addition, the number of CSI-RS antenna ports may be determined according to the number of antenna ports configured as such.

The UE reports (transmits) the channel state information (CSI) to the eNB (step, S1903).

Here, the UE may compute the CSI by using the CSI-RS received from the eNB. The CSI may include CQI, PMI, CRI, RI, LI (Layer Indication) and/or L1-RSRP.

At this time, according to the embodiments of the present invention, a reporting of a specific RI and/or PMI is not allowed for the UE depending on the bitmap for configuring CSR and/or the bitmap for rank restriction configuration described above.

Particularly, the reporting of PMI is not allowed, which corresponds to a precoder (or beam) associated with the bit to which CSR is indicated in the bitmap for configuring CSR. In addition, in the bitmap for rank restriction configuration, the reporting of RI is not allowed, which corresponds to a layer associated with the bit in which rank restriction is indicated.

For example, as described above, in the case that a common bitmap is used without regard to the number of layers (or ranks) for configuring CSR, interpretation method may be changed depending on the number of layers (or ranks). In the case that the number of antenna ports is configured to be 16 or more and the number of layers (or ranks) associated with the RI in the CSI is 3 or 4, a unit of multiple (e.g., 3) bits in a bitmap for configuring the CSR may be associated with each precoder. In addition, in the case that the CSR is indicated in any one of the multiple bits (e.g., bit value is '0'), a reporting of precoding matrix indicator (PMI) corresponding to the precoder associated with the multiple bits may be not allowed (restricted). On the other hand, except the case that the number of antenna ports is configured as 16 or more and the number of layers associated with the RI in the CSI is 3 or 4, each bit in the bitmap for configuring the CSR may be associated with each precoder, and a reporting of PMI corresponding to the precoder associated with a bit in which the CSR is indicated may not be allowed (restricted) in the CSI.

In addition, as in the description of FIG. 18 above, in the case that the number of antenna ports for transmitting CSI-RS is 16 or more and the number of layers (or ranks) is 3 or 4, multiple bits may include three bits. At this time, indexes of the three bits may have a multiple relation of a specific number (e.g., N_2*O_2). At this time, the bits belong to a bitmap for CSR configuration may be indexed sequentially from zero, from LSB (Most Significant Bit) to MSB (Most Significant Bit).

In addition, the bits in the bitmap for CSR configuration may belong to one or multiple bit units. For example, in the bitmap constructed by a_n, . . . , a_0, a_40 may belong to both of multiple bit units constructed by (a_24, a_32, a_40) and multiple bit units constructed by (a_40, a_48, a_56). In addition, a_48 may belong to multiple bit units constructed by (a_40, a_48, a_56). Accordingly, when the CSR is indicated to either one of bit in the bitmap for CSR configuration, depending on whether the multiple bit units to which this bit belongs is 1 or multiple numbers, a reporting of the PMI corresponding to a single precoder or multiple precoders may be restricted In addition, according to the above embodiments of the present invention, a bit-width of CSI feedback may be flexibly determined based on the bitmap for configuring CSR and/or the bitmap for configuring rank restriction. Particularly, a bit-width for reporting the RI in the CSI may be determined depending on a number of RIs (i.e., the number of bits in which rank restriction is not indicated).

General Apparatus to which the Present Invention May be Applied

Figure 20:
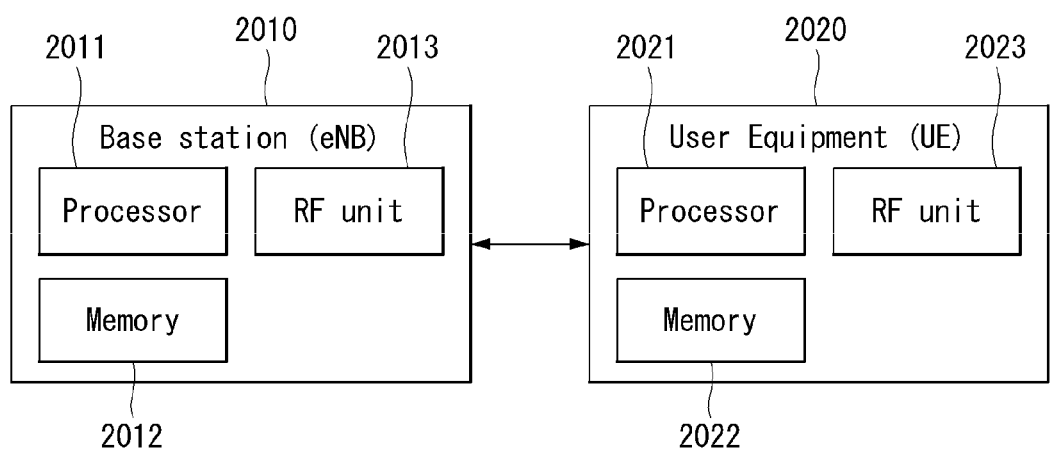
FIG. 20 illustrates a block diagram of a wireless communication apparatus according to an embodiment of the present invention.

FIG. 20 illustrates a block diagram of a wireless communication apparatus according to an embodiment of the present invention.

Referring to FIG. 20, the wireless communication system includes a base station (eNB) 2010 and a plurality of user equipments (UEs) 2020 located within the region of the eNB 2010.

The eNB 2010 includes a processor 2011, a memory 2012 and a radio frequency (RF) unit (or transceiver) 2013. The processor 2011 implements the functions, processes and/or methods proposed in FIGS. 1 to 19 above. The layers of wireless interface protocol may be implemented by the processor 2011. The memory 2012 is connected to the processor 2011, and stores various types of information for driving the processor 2011. The RF unit 2013 is connected to the processor 2011, and transmits and/or receives radio signals.

The UE 2020 includes a processor 2021, a memory 2022 and a radio frequency (RF) unit (transceiver) 2023. The processor 2021 implements the functions, processes and/or methods proposed in FIGS. 1 to 19 above. The layers of wireless interface protocol may be implemented by the processor 2021. The memory 2022 is connected to the processor 2021, and stores various types of information for driving the processor 2021. The RF unit 2023 is connected to the processor 2021, and transmits and/or receives radio signals.

The memories 2012 and 2022 may be located interior or exterior of the processors 2011 and 2021, and may be connected to the processors 2011 and 2021 with well known means. In addition, the eNB 2010 and/or the UE 2020 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention, applied to 3GPP 5G (5 generation) system, is primarily described as an example, but may be applied to various wireless communication systems in addition to the 3GPP 5G (5 generation) system.

The invention claimed is:

1. A method for transmitting channel state information in a wireless communication system, the method performed by a User Equipment (UE) comprising:
 receiving, from a base station, a bitmap for configuring codebook subset restriction (CSR); and
 reporting, to the base station, Channel State Information (CSI),
 when a number of antenna ports is configured as 16 or more and a number of layers associated with a rank indicator (RI) in the CSI is 3 or 4,
 wherein a unit of multiple bits in a bitmap for configuring the CSR is associated with each precoder, the multiple bits includes three bits, and each of the indexes of the three bits has a value associated with a consecutive specified number,
 wherein a reporting of precoding matrix indicator (PMI) corresponding to the precoder associated with the multiple bits is restricted in the CSI, when the CSR is indicated in any one of the multiple bits, and
 wherein each bit in the bitmap for configuring the CSR is associated with each precoder, and a reporting of PMI corresponding to the precoder associated with a bit in which the CSR is indicated is restricted in the CSI, except the case that the number of antenna ports is configured as 16 or more and the number of layers associated with the RI in the CSI is 3 or 4.

2. The method of claim 1, wherein the bitmap for configuring the CSR is commonly applied without regard to the number of layers associated with the rank indicator (RI) in the CSI.

3. The method of claim 1, wherein the bit in the bitmap for configuring the CSR belongs to a unit of one or multiple bits.

4. The method of claim 1, when the CSR is indicated in any one bit in the bitmap for configuring the CSR, depending on the number of a unit of multiple bits to which the one bit belongs, a reporting of the PMI corresponding a single or multiple precoders is restricted.

5. The method of claim 1, further comprising receiving, from the base station, a bitmap for a rank restriction configuration.

6. The method of claim 5, wherein a bitwidth for reporting the rank indicator (RI) in the CSI is determined depending on a number of rank indicators in which a reporting is allowed by the bitmap for the rank restriction configuration.

7. The method of claim 5, wherein a reporting of the rank indicator (RI) corresponding to the layer associated with a bit in which a rank restriction in the bitmap for the rank restriction configuration is indicated is restricted in the CSI.

8. The method of claim 1, wherein the UE is a UE in which a codebook type of a single panel to which a linear combination is not applied is configured.

9. A method for receiving channel state information in a wireless communication system, the method performed by a base station comprising:
- transmitting, to a User Equipment (UE), a bitmap for configuring codebook subset restriction (CSR); and
- receiving, from the UE, Channel State Information (C SI),
- when a number of antenna ports is configured as 16 or more and a number of layers associated with a rank indicator (RI) in the CSI is 3 or 4,
- wherein a unit of multiple bits in a bitmap for configuring the CSR is associated with each precoder, the multiple bits includes three bits, and each of the indexes of the three bits has a value associated with a consecutive specified number,
- wherein a reporting of precoding matrix indicator (PMI) corresponding to the precoder associated with the multiple bits is restricted in the CSI, when the CSR is indicated in any one of the multiple bits, and
- wherein each bit in the bitmap for configuring the CSR is associated with each precoder, and a reporting of PMI corresponding to the precoder associated with a bit in which the CSR is indicated is restricted in the CSI, except the case that the number of antenna ports is configured as 16 or more and the number of layers associated with the RI in the CSI is 3 or 4.

10. The method of claim 9, wherein the bitmap for configuring the CSR is commonly applied without regard to the number of layers associated with the rank indicator (RI) in the CSI.

11. The method of claim 10, wherein the bit in the bitmap for configuring the CSR belongs to a unit of one or multiple bits.

12. The method of claim 11, when the CSR is indicated in any one bit in the bitmap for configuring the CSR, depending on the number of a unit of multiple bits to which the one bit belongs, a reporting of the PMI corresponding a single or multiple precoders is restricted.

13. The method of claim 9, further comprising receiving, from the base station, a bitmap for a rank restriction configuration.

14. The method of claim 13, wherein a bitwidth for reporting the rank indicator (RI) in the CSI is determined depending on a number of rank indicators in which a reporting is allowed by the bitmap for the rank restriction configuration.

15. The method of claim 13, wherein a reporting of the rank indicator (RI) corresponding to the layer associated with a bit in which a rank restriction in the bitmap for the rank restriction configuration is indicated is restricted in the CSI.

16. The method of claim 9, wherein the UE is a UE in which a codebook type of a single panel to which a linear combination is not applied is configured.

* * * * *